United States Patent
McIntosh et al.

(10) Patent No.: US 6,661,637 B2
(45) Date of Patent: Dec. 9, 2003

(54) APPARATUS AND METHOD TO ANGULARLY POSITION MICRO-OPTICAL ELEMENTS

(76) Inventors: Robert B. McIntosh, 309 Vassar Rd., Alexandria, VA (US) 22314; Steven R. Patterson, 1179 Ashford Green Ave., Concord, NC (US) 28027

(*) Notice: Subject to any disclaimer, the term of this patent is extended or adjusted under 35 U.S.C. 154(b) by 99 days.

(21) Appl. No.: 09/954,670

(22) Filed: Sep. 18, 2001

(65) Prior Publication Data

US 2002/0033048 A1 Mar. 21, 2002

Related U.S. Application Data

(63) Continuation-in-part of application No. 09/482,119, filed on Jan. 13, 2000, now Pat. No. 6,456,477, and a division of application No. 09/037,733, filed on Mar. 10, 1998, now Pat. No. 6,151,967.

(51) Int. Cl.[7] ............................................... H02H 23/00
(52) U.S. Cl. ........................ 361/233; 361/207; 361/225
(58) Field of Search .................................. 361/115, 225, 361/233, 207

(56) References Cited

U.S. PATENT DOCUMENTS 6,034,810 A * 3/2000 Robinson et al. ............ 359/293
6,335,850 B1 * 1/2002 Dunfield et al. ........... 360/294.5
6,400,550 B1 * 6/2002 Wood et al. ................. 361/277

* cited by examiner

Primary Examiner—Stephen W. Jackson

(57) ABSTRACT

A micro-opto-electro-mechanical transducer in which an optical element is angularly positioned by electrical field coupling. Movable electrodes of two orthogonally disposed, differential variable capacitors are coupled to the optical element constrained by structural means to angular displacement around two free-axes of rotation. Cooperating stationary capacitor electrodes with surface contoured regions facing the movable electrodes are affixed to the structural means. A thin dielectric layer of high permittivity material provides a region of fixed spacing between the capacitor electrodes. The surface contoured regions constrain the approach of the movable electrodes with angular displacement of the optical element. Both the open-loop gain and the equilibrium voltage-angle response of the transducer is largely independent of displacement. Electrostatic force feedback maintains the optical element at voltage programmed positions of static equilibrium over a wide angular range of tip and tilt. In simpler embodiments, the optical element is angularly positioned in one direction around one axis of rotation. A preferred method of control allows an electrode of each variable capacitor to be electrically grounded.

19 Claims, 13 Drawing Sheets

APPARATUS AND METHOD TO ANGULARLY POSITION MICRO-OPTICAL ELEMENTS

CROSS-REFERENCE TO RELATED APPLICATIONS

This application is a continuation-in-part application of divisional application of U.S. Ser. No. 09/482,119, filed Jan. 13, 2000, now U.S. Pat. No. 6,456,477 of application U.S. Ser. No. 09/037,733, filed Mar. 10, 1998, now U.S. Pat. No. 6,151,967, issued Nov. 28, 2000. This application references art disclosed in continuation-in-part applications: U.S. Ser. No. 09/834,691, filed Apr. 13, 2001; U.S. Ser. No. 09/816,551, filed Mar. 24, 2001; and U.S. Ser. No. 09/794,198, filed Feb. 27, 2001, of divisional application U.S. Ser. No. 09/482,119. Each disclosure of the foregoing applications are expressly incorporated herein by reference. All of the applications are assigned to the same assignee as the present application.

GOVERNMENT RIGHTS

This invention was made with Government support under contract N00024-97-C-4157 from the Naval Sea Systems Command. The Government has certain rights to this invention.

FIELD OF THE INVENTION

The present invention relates to micro-optical elements that rotate bi-directionally around one or two axes of rotation. More specifically, this invention relates to micro-opto-electro-mechanical (MOEM) devices that sense and electrostatically control the angular position of an optical element.

BACKGROUND OF THE INVENTION

Improved and more robust micromachined beam steering mirrors with high angular position accuracy are desired for fiber optics communications networks, free-space laser communications systems, laser radars, and projection displays. Micromirror arrays can be used for cross-connect switches and add/drop multiplexers in all-optical networks. Mirrors controlled by electrostatic force feedback around two axes of rotation over large angular ranges can enhance the performance of compact scanning, tracking, pointing, imaging, image stabilization, laser marking, and laser micromachining systems.

The micromirrors of many prior-art optical switches have one or two stable positions in which to redirect an optical beam to a designated output. Optical switches with torsional mirrors can route an optical signal from an input fiber to any one of N output fibers in a 1-D array. A mirror mounted by thin-film, torsional flexure beams in a double gimbal arrangement can be positioned around two axes of rotation to route an optical signal to any fiber in a bundle of N×M fibers in a 2-D array.

Mirrors suspended by torsional flexures and gimbal frames are angularly displaced by electrostatic torque developed by applying a voltage across the electrodes of a variable air-gap capacitor. Capacitor electrodes are formed on a surface of the mirror and cooperating electrodes are attached to stationary structure. Four pairs of cooperating capacitor electrodes are required to angularly position an optical element bi-directionally around two axes of rotation.

A disadvantage of controlling a micromirror by a variable air-gap capacitor is the narrow spacing between the capacitor electrodes limits the displacement of the movable electrode. This displacement is further restricted by the well-known "pull-in" instability that occurs at a critical voltage at which the movable electrode deflects by about ⅓ of the un-deflected capacitor gap. Electrode collapse arises due to the highly nonlinear force of attraction between the capacitor electrodes with applied voltage. This force varies as the inverse of the gap spacing squared while the elastic reaction torque of flexure means remains substantially linear over allowable angles of mirror tilt.

It is known that a control voltage superimposed on a larger fixed bias voltage improves the ability to control a torsional mirror over a small range of angles. It is also well know that differential capacitors can further improve force linearity as disclosed by Uchimaru, U.S. Pat. No. 5,740,150. However, the difficulties, limitations, and electronic complexity of obtaining a reasonably well behaved response for a two-axis, micromachined beam steering mirror over a practical angular range of tip and tilt were demonstrated analytically and experimentally by Toshiyoshi, et al., "Linearization of Electrostatically Actuated Surface Micromachined 2-D Optical Scanner," *J. Micro Electro Mech Syst.* vol. 10, no. 2, 2001. This difficulty is compounded because the non-linear force-angle characteristic of a mirror driven by air-gap capacitor actuator is dependent upon both the angular position and vertical displacement of the mirror element.

P. F. Van Kessel, et. al.,"MEMS-Based Projection Display," *Proc. IEEE,* vol. 86, August 1998, describe a digital micromirror device (DMD) comprising an array of thin-film, torsional mirror elements. The mirrors are rapidly switched between two stable states of deflection to spatially modulate light for image projection. Although the mirror elements are deflected to angles of about ±10°, the problem of a non-linear electrostatic transfer function is accommodated. When the DMD mirror is tilted away from its relaxed state, a leading edge of the mirror mechanically lands on a surface beyond the control electrodes to prevent total electrostatic collapse.

Another short coming of prior-art, micromirror arrays is that the mirror elements and support structure are generally micromachined from thin-films, e.g., polysilicon or metals. It is difficult to control film stresses, bending, and out-of-plane distortion of components constructed of these materials. Micromirrors suspended by double gimbals with two pairs of torsional flexure beams are complex devices to fabricate and are difficult to control because the non-linear response is also coupled to bending deformations.

The advantages of electrostatically controlled actuators with curved electrodes are well known, e.g., Legtenberg, et. al., "Electrostatic Curved Electrode Actuators," *Proc. IEEE Conf. on Micro Electro Mechanical Syst.,* Amsterdam, The Netherlands, January-Febuary, 1995. These actuators operate at substantially lower bias and control voltages than actuators with variable air-gap capacitors.

The variable capacitor of U.S. Pat. No. 6,151,967 with a contoured stationary electrode can be operated as an electrostatic actuator as disclosed in "Force-Balanced Capacitive Transducer," U.S. patent application Ser. No. 09/866,351, May 25, 2001. This capacitor is referred to herein as variable area capacitor (VAC) since a substantial portion of a change in capacitance with a applied force is due to an increase in effective electrode area rather than a change in electrode spacing. The capacitance of a VAC increases as an area of fixed capacitive spacing increases between cooperating electrodes while the approach of a movable electrode with respect to a stationary electrode remains small.

An advantage of sensors and actuators with regions of fixed dielectric capacitance spacing between cooperating electrodes is the very large capacitance change and high values of quiescent capacitance typical of these transducers. This results in several orders of magnitude increased dynamic range. High quiescent capacitance avoids the noise limitations of small capacitors and associated detection electronics as well as the reduction of transducer sensitivity due to parasitic capacitance. Problems associated with the pickup of stray signals are reduced if one electrode of a variable capacitor, or the common electrode of a differential variable capacitor is grounded.

Accordingly, optical mirrors and switches of simple construction are desired that bi-directionally position an optical beam around two axes of rotation to high angular resolution and accuracy; operate at low bias and control voltages over practical angular ranges; and are micromachined from silicon or another a high strength material with stable mechanical properties.

SUMMARY OF THE INVENTION

The general object of the present invention is to provide an opto-electro-mechanical transducer, a method of construction, and a method to control the angular position of a rigid body without the performance limitations of prior-art transducers with variable air-gap capacitors. The rigid body can include a mirror, lens, grating, filter, holographic element, electrical component, or mechanical component. The embodiments of the present invention employ variable capacitors with regions of fixed capacitance spacing between cooperating electrodes to develop greater electrostatic forces and larger displacements at low operating voltages compared to prior-art capacitors actuators.

A specific objective is to provide micromirrors and optical switches having a substantially linear equilibrium force-angle response characteristic that can be controlled to high angular accuracy by closed-loop electrostatic force feedback over a range of tip and tilt angles.

Another objective is to provide a transducer with structural means that allows an optical element to bi-directionally rotate around two axes rotation without the complexity of a gimbal frame and position varying voltage compensation.

Still another objective is to provide a method to micromachine MOEMS with micro-optical elements from single-crystal silicon or another a high strength material with stable mechanical properties.

A further objective is to provide a method of control that allows an electrode of an electrostatic actuator to be electrically grounded and a cooperating electrode to simultaneously sense and control the angular position of an optical element. And alternately, provide a differential opto-electro-mechanical transducer with differential sense and control electrodes and a common ground electrode.

DETAILED DESCRIPTION

Further objects and advantages of the present invention will become apparent from the following description. To avoid obscuring the description of the invention with unnecessary detail, well known techniques for processing semiconductor materials and fabricating MOEMS components are referred to without elaboration. The drawings are schematic in nature and the features shown are not drawn to relative scale; like reference numbers designate similar parts or elements with similar functions.

Figure 1:
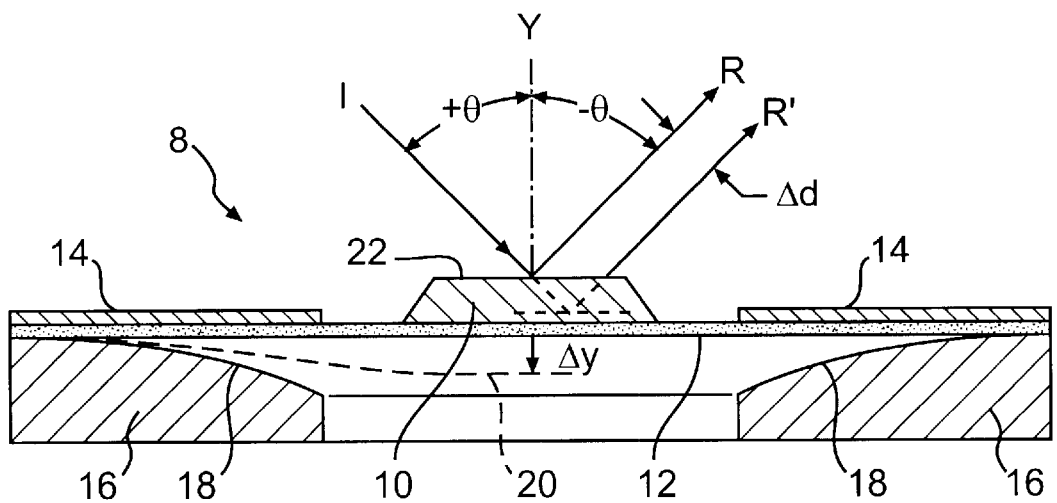
FIG. 1, is a simplified sectional view of an optical element displaced by a flexible diaphragm of a variable capacitor with a region of fixed capacitance spacing.

A variable capacitive transducer that controls the displacement of an optical element is described first to help explain the construction and operation of preferred embodiments of the present invention. FIG. 1 is a simplified sectional view of a VAC transducer generally indicated by reference numeral 8 with an optical element 10 suspended by a thin-film diaphragm 12 of dielectric material of high permittivity compared to air. A conductive film electrode 14 deposited on diaphragm 12 surrounding optical element 10 forms a flexible capacitor electrode. Diaphragm 12 is affixed to an outside portion of a stationary cooperating capacitor electrode 16 having a surface contoured region 18. The dielectric material of diaphragm 12 maintains a region of fixed capacitive spacing between mutually opposed areas of the capacitor electrodes. This region of fixed spacing increases with deflection of flexible electrode 14.

When voltage V is placed across the capacitor electrodes, a distributed electrostatic force $F_e$ of attraction displaces diaphragm 12 and optical element 10 to a new position shown by dashed line 20. This position of static force equilibrium is reached when tensile and bending reaction forces of the diaphragm match force $F_e$ due to electric field coupling. The range of displacement $\Delta y$ and magnitude of electrostatic force $F_e$ for a control voltage V is much greater than the values for practical actuators with variable air-gap capacitors of comparable size. The thickness of diaphragm 12, typically 0.2 to 2 micrometers, is limited by the dielectric strength of the diaphragm material and by Paschen's Law in the gaseous medium in adjacent regions of narrow electrode spacing.

When element 10 is a plane mirror, an optical ray I striking reflecting surface 22 at an angle of incidence $\theta$ is reflected at an angle of reflection $-\theta$. When the mirror is displaced a distance $\Delta y$, reflected ray R is displaced a distance $\Delta d$ to a new position shown by ray R' and the optical path length traversed by the ray is increased accordingly.

The energy $W_e$ stored in the electric field of the variable capacitor electromechanically coupled to optical element 10 can be approximated by, $$W_e = \frac{1}{2}CV^2 \approx \frac{1}{2}\frac{\epsilon A}{s}V^2 \qquad (1)$$

where, C is the capacitance of the VAC, A is the effective area of the capacitor electrodes determined predominately by the region of fixed capacitance spacing, s is the effective spacing between the capacitor electrodes determined predominately by the thickness of diaphragm 12, $\epsilon$ is the effective dielectric constant of the medium between the capacitor electrodes determined predominately by the permittivity of the dielectric material of diaphragm 12, and V is the voltage across the capacitor electrodes. The corresponding generalized electrostatic force $F_e$ associated with a deflection $\xi$ due to electric field coupling can be calculated by differentiating the electrostatic energy:

$$F_e = \frac{\partial W_e}{\partial \xi} = \frac{\partial W_e}{\partial C} \cdot \frac{\partial C}{\partial \xi} = \frac{\partial C}{\partial \xi}\frac{V^2}{2}. \qquad (2)$$

The profile of surface contoured region 18 can be selected to constrain the approach of flexible electrode 14 with displacement of diaphragm 12 to provide a substantially linear increase in capacitance with deflection within the tolerance limits of micro-fabrication. Ideally, this condition is satisfied when $\partial C/\partial \xi$ remains substantially constant over a selected range of mirror displacement. Such a profile provides a force substantially independent of electrode spacing, thereby avoiding the severe non-linearity associated with a mechanically unconstrained capacitor electrode.

It is generally desirable to apply a bias voltage $V_B$ to mechanically pre-load diaphragm 12 at a selected operating position and corresponding quiescent capacitance $C_0$. A control voltage V is then superimposed on voltage $V_B$ to control the position of optical element 10. This provides a non-zero value of gain $\partial F_e/\partial V$ at zero control voltage V. For this mode of operation, an incremental change in force $F_e$ with voltage is substantially constant since $$\frac{\partial F}{\partial V} = K(V + V_B) \qquad (3)$$

where K equals $\partial C/\partial \xi$ which is substantially fixed for the profile selected for surface contour 18.

The action of a VAC actuator can be understood by realizing that the fixed spacing between electrodes is so small that a rising voltage continuously collapses flexible electrode 14 across contoured region 18 of stationary electrode 16. This increases the area A contributing to the capacitance between the electrodes and provides large displacements not limited by the dimensions of a narrow air gap.

When a flexible electrode of a VAC comprises a metal layer deposited on a thin silicon nitride layer, the dielectric constant of the insulating film is about seven times higher than air, further increasing both capacitance variation with area and quiescent capacitance. One advantage of capacitive transducers fabricated with silicon nitride membranes is that LPCVD nitride films can be formed with low stress and a coefficient of thermal expansion that closely matches silicon.

For a variable capacitor constructed with a dielectric spacer layer deposited on a stationary electrode, dielectric constants of 25 and more are possible with the oxides of tantalum, zirconium, and hafnium. These materials provide at least a fivefold increase in force or a fivefold decrease in actuation voltage compared to variable air-gap capacitors of equivalent size.

A VAC can be used to simultaneously sense and control the position of an optical element by the method of electrostatic force feedback. U.S. patent application Ser. No. 09/866,351 discloses a preferred method to measure the capacitance of a transducer to control the displacement of a rigid body, e.g., seismic mass or optical element. One electrode of a VAC is coupled to an input of a capacitance measurement circuit and a second cooperating electrode is electrically grounded. The circuit measures the capacitance of the VAC with respect to either a reference capacitor, a reference voltage, or a second differential VAC in a continuously null-balanced bridge network. An output voltage of the measurement circuit is amplified to provide a feedback voltage to electrostatically force balance the movable electrode of the capacitive transducer. When a position programming voltage is applied to the bridge network, the resulting feedback voltage deflects a rigid body to a new position of force equilibrium and a new value of quiescent capacitance $C_0'$. The change in capacitance $\Delta C$ of the VAC is proportional to the programming voltage over a wide linear dynamic range.

Figure 2:
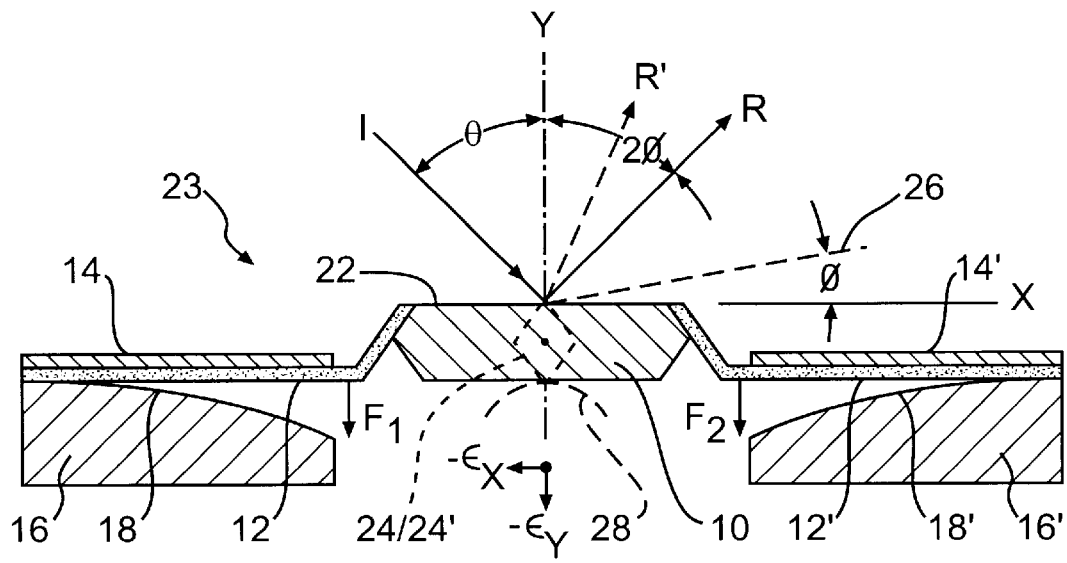
FIG. 2, is a simplified sectional view of an opto-electro-mechanical transducer with an optical element coupled to torsional flexure means.

FIG. 2 is a sectional view of an opto-electro-mechanical transducer with at least one electrical coupling field generally indicated herein by reference numeral 23. An optical element 10 is supported on opposing sides by a pair of torsional flexure means 24 and 24' with axes normal to the X-Y plane of the diagram. The flexure means constrain element 10 to angular rotation around one free-axis of rotation established by the centroids of the cross-sections of the flexure means. Two, thin-film dielectric members 12 and 12' mechanically couple orthogonally disposed sides of optical element 10 to edge portions of stationary capacitor electrodes 16 and 16' respectively. The stationary electrodes have symmetrical surface contoured regions 18 and 18' which face dielectric members 12 and 12' respectively. Thin film electrodes 14 and 14' formed on selected portions of dielectric members 12 and 12' respectively comprise the cooperating electrodes of two, variable capacitors $C_1$ and $C_2$ each having a region of fixed capacitance spacing determined by the thickness of the dielectric members. Dashed line 26 shows the position a reflecting surface 22 rotated counter-clockwise to an angle $\phi$ when optical element 10 is a plane mirror. Element 10 is angularly displaced by applying a voltage V across capacitor electrodes 14 and 16 to create a tractive force $F_1$ that couples a torque to optical element 10. This causes a reflected optical ray R of an incident ray I to be rotated by angle $2\phi$ to a new direction shown by ray R'. Ray R' is also displaced in the X-Y plane by distances $-\in_x$ and $-\in_y$ that are too small to be shown in FIG. 2. Displacement $-\in_y$ arises due to the offset of reflecting surface 22 from its axis of rotation, and displacement $-\in_y$ arises due to the elastic bending of flexure means 24 and 24' due force $F_1$. A bearing placed under element 10 at a location shown by dashed curve 28 can be used to further constrain vertical displacement. When a voltage V' is applied across capacitor electrodes 14' and 16', a tractive electrostatic force $F_2$ is created by electric field coupling to angularly rotate optical element 10 clockwise.

The energy $W_e$ stored in the electric field in capacitors $C_1$ or $C_2$ electromechanically coupled to optical element 10 can be expressed as, $$W_e = \frac{1}{2}C(\theta)V^2 \tag{4}$$

where, $C(\theta)$ is the capacitance of the variable capacitor, $\theta$ an angle of rotation of element 10, and V a voltage applied across the capacitor electrodes. The electrostatic torque $F_e$ resulting from a change of energy $W_e$. due to a change in angle $\theta$ is $$F_e = \frac{\partial W_e}{\partial \theta} = \frac{1}{2}\frac{\partial C(\theta)}{\partial \theta}V^2. \tag{5}$$

When stationary electrodes 16 and 16' are electrically connected, capacitors $C_1$ and $C_2$ form the cooperating capacitors of a differential capacitor that can angularly position optical element 10 bi-directionally around one axis of rotation.

A preferred method to control the position of optical element 10 is to apply a differential bias voltage $+V_B$ and $-V_B$ to electrodes 14 and 14' to couple a balanced electrostatic torque to opposing sides of optical element 10. At this position, the optical element resides at a neutral position $\theta=\theta_0$ and capacitors $C_1$ and $C_2$ have substantially equal quiescent values $C_0$. When a control voltage V is superimposed on the bias voltage at each control electrode, optical element 10 will angularly rotate to a new angle $\theta_i$ to reestablish static force equilibrium. The net force F of the system at this new position of equilibrium is zero and can be generally expressed as, $$F = \left[\frac{\partial C_1(\theta)}{\partial \theta}\frac{(V+V_B)^2}{2} - \frac{\partial C_2(\theta)}{\partial \theta}\frac{(V-V_B)^2}{2} - k_\theta \theta\right]_{\theta=\theta_i} \tag{6}$$

where, $k_\theta$ is the torsional stiffness of flexural means. The profile of surface contoured regions 18 and 18' of transducer 23 can be selected within the limits of micro-fabrication tolerances to maintain $\partial C(\theta)/\partial \theta$ at the same near-constant value K for both capacitors over a range of tilt angles $\theta_i \leq |\theta_{max}|$. For this condition, equation (6) can be simplified yielding, $$F = (V+V_B)^2 - (V-V_B)^2 - \frac{2k_\theta \theta}{K} \tag{7}$$
$$= 2KV_BV - k_\theta\theta.$$

The gain $G_D$ of this electric field coupled system found by differentiation is, $$G_D = \frac{dF}{dV} = 2KV_B \quad (\theta_i \leq |\theta_{max}|) \tag{8}$$

which indicates that $G_D$ is constant and proportional to $V_B$. At static equilibrium, an angle of tilt $\theta$ is also linear with control voltage V since $$\theta = \frac{2KV_B}{k_\theta}V. \tag{9}$$

Equations 8 and 9 illustrate two advantages of the present invention. Both the open-loop gain and the equilibrium voltage-angle response of transducer 23 are largely independent of angular deflection.

For the preferred embodiments, it is sufficient to select a surface contour for stationary electrodes 18 and 18' that is convenient to fabricate, one which reasonably approximates the condition that $\partial C(\theta)/\partial \theta$ have a constant value over a range of angles. It is generally sufficient that a region of fixed capacitance spacing exist between the capacitor electrodes over the angular operating range. This provides a continuous state of static equilibrium over an angular range to avoid the severe non-linearity of variable air-gap capacitors.

The methods of electrostatic force feedback described hereinabove for transducer 8 also can be used to control and maintain optical element 10 of transducer 23 at a constant angular position.

First Preferred Single-Axis Embodiment

Figure 3:
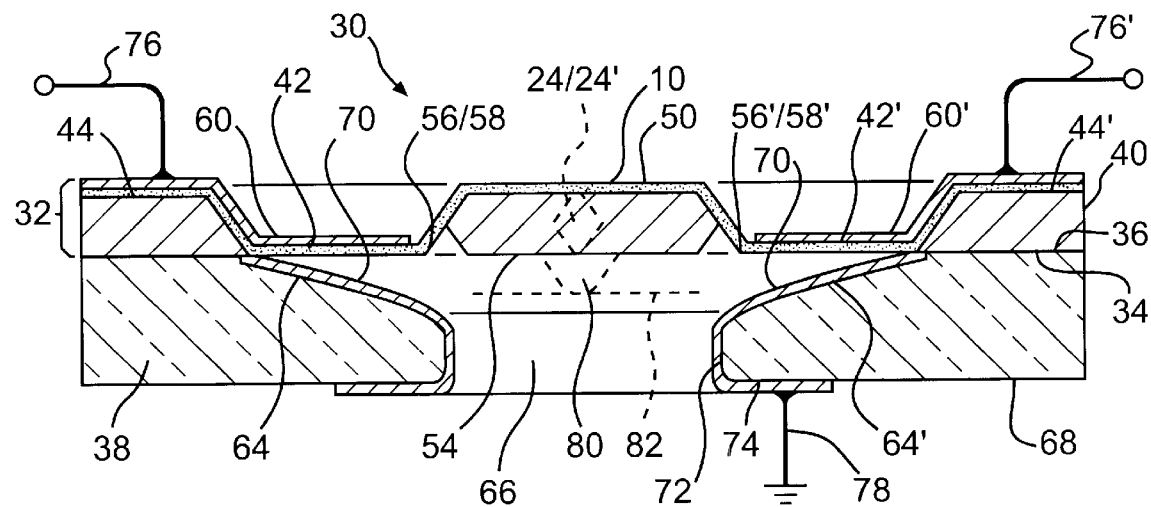
FIG. 3, is a sectional view of a first, single-axis embodiment of the present invention.
Figure 4:
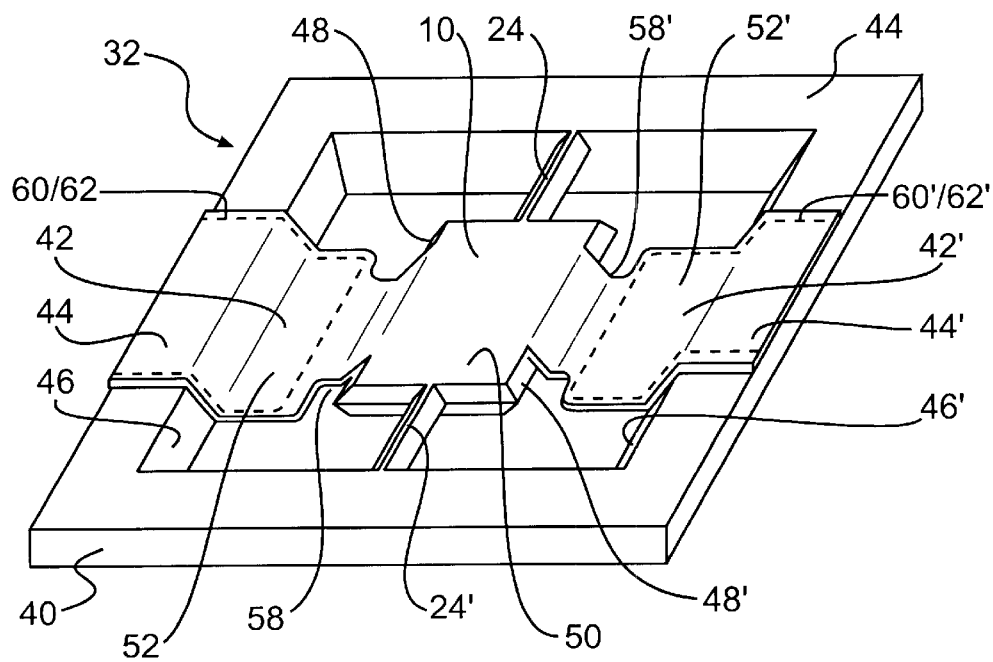
FIG. 4, is a view of a micromachined structure of the embodiment of FIG. 2.

FIG. 3, is a sectional view of a first, single-axis embodiment of an opto-electro-mechanical transducer of the present invention generally indicated herein by reference numeral 30. The construction of transducer 30 can be more easily visualized when FIG. 3 is viewed in combination with FIG. 4, a view of a micromachined structure generally shown by reference numeral 32. Transducer 30 comprises micromachined structure 32 of single-crystal silicon bonded at a bottom surface 34 to a top surface 36 of an insulating substrate 38. Micromachined structure 32 includes an optical element 10 coupled to an integral support frame 40 by two torsional flexure means 24 and 24' that constrain element 10 to angular rotation around one free-axis of rotation. Referring to FIG. 4, opposing sides of optical element 10 are coupled to support frame 40 by two flexible thin-film members 42 and 42'. The thin-film members comprise dielectric material deposited on top surface regions 44 and 44' and two interior walls 46 and 46' of frame 40; on opposing sidewalls 48 and 48' and top surface 50 of optical element 10; and include unsupported regions 52 and 52'. A portion of the silicon at a bottom surface 54 of element 10 at the silicon to dielectric film interface 56 and 56' is etched to form spring hinges 58 and 58' at the edges of unsupported regions 52 and 52'. Hinges 58 and 58' allow optical element 10 to rotate to greater angles of tilt than possible by just elastic stretching of thin film regions 52 and 52' alone. Metal films 60 and 60' deposited over thin-film members 42 and 42' within the boundaries shown by broken lines 62 and 62' in FIG. 4 form electrodes electrically extending over surface regions 44 and 44' on support frame 40 on which to bond electrical terminals.

Two surface contoured regions 64 and 64' are formed over and in surface 36 of substrate 38. A connecting cavity 66 formed between surface contoured regions 64 and 64' and a bottom surface 68 of substrate 38 provides a path over which to form an electrical connection. A metal film 70 formed selectively on contoured regions 64 and 64', on a sidewall 72 of cavity 66, and on a surface region 74 of surface 68 forms a common cooperating capacitor electrode electrically extended to surface region 74 on which to bond an electrical terminal. Electrical terminals 76 and 76' are bonded to metal films 60 and 60' over surface regions 44 and 44', and a common terminal 78 is bonded to metal film 70 over surface region 74.

Metal film 60 on flexible thin-film member 42 and metal film 70 on contoured region 64 comprise the cooperating electrodes of a first variable capacitor $C_1$. Metal film 60' on thin-film member 42' and the same metal film 70 on contoured region 64' comprise the cooperating electrodes of a second variable capacitor $C_2$. Metal film 70 for this embodiment forms a common electrode of both capacitors $C_1$ and $C_2$ or two cooperating capacitors of a differential variable capacitor. The dielectric material of thin-film members 42 and 42' establish regions with fixed capacitive spacing between mutually opposed areas of the flexible and rigid electrodes of capacitors $C_1$ and $C_2$. These areas of fixed capacitance increase as metal films 60 and 60' deflect in response to an electrostatic force of attraction. Optical element 10 can be rotated counter-clockwise or clockwise by applying a voltage to either terminal 76 or 76' respectively when terminal 78 is grounded. A simpler, single-side embodiment of transducer 30 can be constructed with one variable capacitor to provide one direction of rotation. Only one control terminal (either 76 or 76') is required to rotate mirror element 10, or alternately, to sense and control the angle of optical element 10 by electrostatic force feedback. Micromachined structure 32 can be either bulk or surface micromachined from a wafer of silicon. The geometry of the sidewalls of optical element 10, flexure means 24 and 24', and support frame 40 shown in FIGS. 3 and 4 are indicative of anisotropic wet etching of (100) silicon by processing steps to described hereinafter.

A dashed outline of an optional bearing 80 with edges rounded by isotropic etching is shown in FIG. 3 extending from bottom surface 54 of optical member 10. Bearing 80 is supported by a central surface region 82 of substrate 38 representatively shown as a dashed line. Optional bearing 80 and surface 82 can be provided to further limit the vertical displacement of optical element 10. An advantage of supporting optical element 10 by a bearing is that flexure means 24 and 24' can be replaced by a pair of flexures means with the construction of thin film members 42 and 42'. This allows transducer 30 to be constructed with four variable capacitors or alternatively two differential variable capacitors. A flexible electrode of least one variable capacitor can be used to rotate optical element 10 around a first axis of rotation and a flexible electrode of at least one, orthogonally disposed, variable capacitor can be used to rotate optical element 10 around a second axis of rotation.

First Preferred Two-Axis Embodiment

Figure 5A:
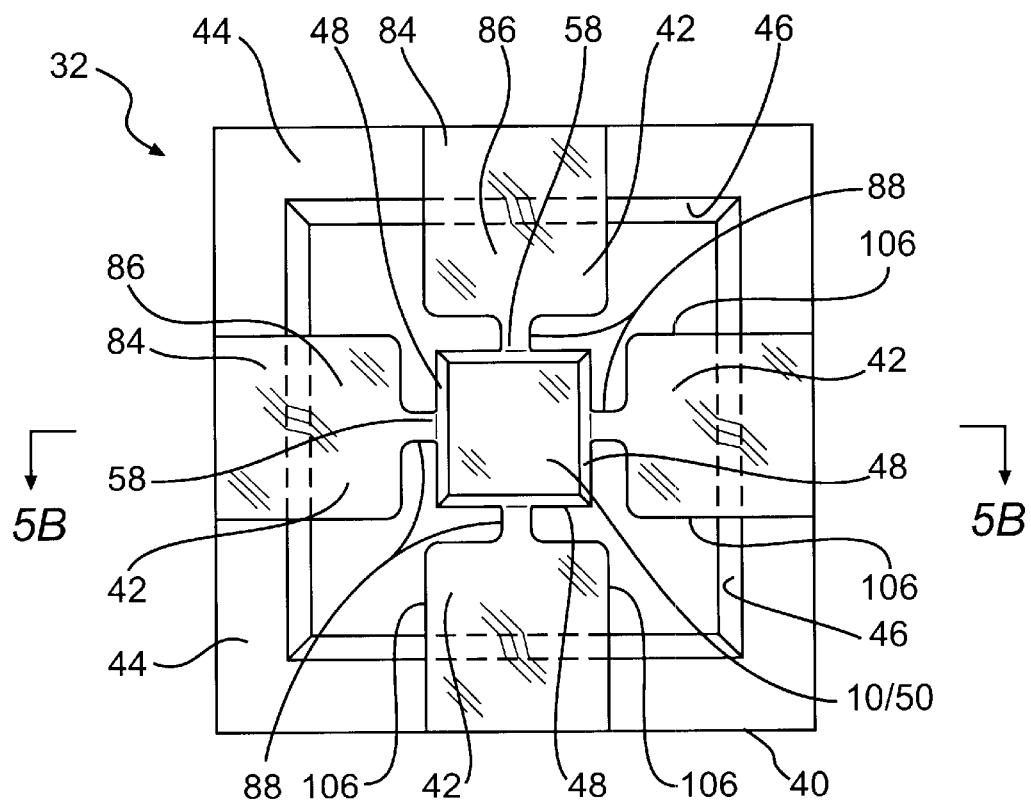
FIG. 5A, is a top view of a micromachined structure of a first, two-axis embodiment of the present invention.
Figure 5B:
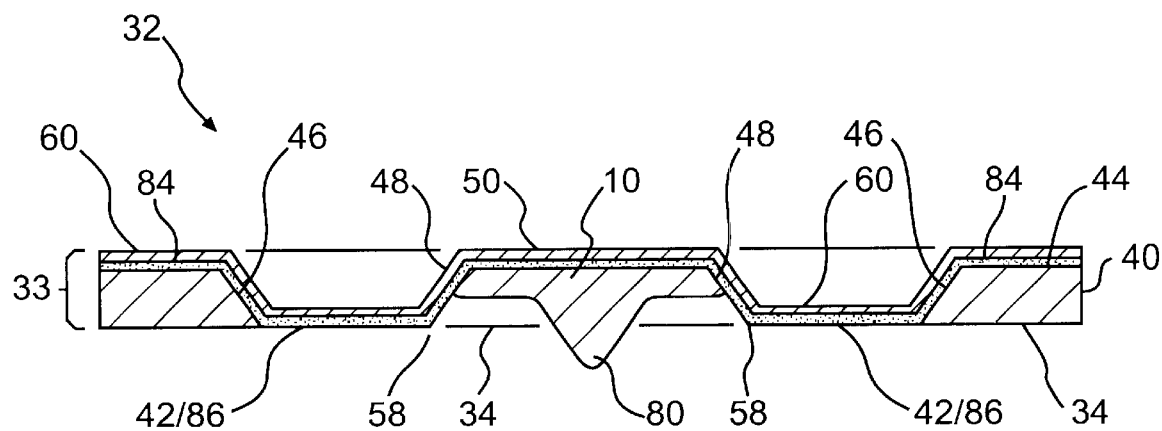
FIG. 5B, is a sectional view of the micromachined structure of FIG. 5A.
Figure 6:
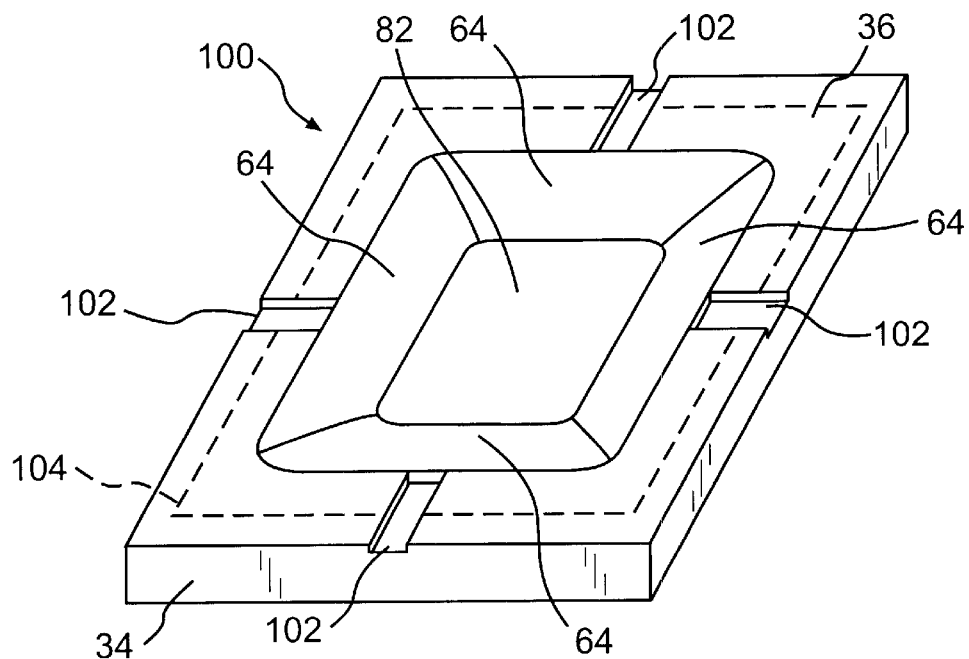
FIG. 6, is a view of the substrate of the first, two-axis embodiment.

A first two-axis embodiment of the transducer of the present invention is generally referred to herein by reference numeral 90. Transducer 90 has a construction similar to transducer 30 of FIG. 3, a micromachined structure bonded to an insulating substrate, but flexure means 24 and 24' are replaced by thin film members. FIG. 5A is a top view and FIG. 5B is a sectional view of micromachined structure 32 of transducer 90. FIG. 6 is a view of the substrate of transducer 90, generally indicated herein by reference numeral 100. Transducer 90 comprises micromachined structure 32 bonded at a bottom surface 34 to a top surface 36 of substrate 100. Referring to FIG. 5A, two pairs of orthogonally disposed thin-film members 42 of dielectric material constrain element 10 from angular rotation around one free-axis of rotation, but allow element 10 to be angularly positioned around two free-axes of rotation. Since thin-film members easily bend, vertical support of optical element 10 is provided by bearing 80 shown in FIG. 5B in contact with a recessed central surface region 82 of substrate 100 of FIG. 6.

Referring FIGS. 5A and 5B, the four thin-film members 42 couple optical element 10 to support frame 40. Each member 42 comprises a shoulder region 84 deposited on surface 44 and a wall 46 of frame 40 and includes a connected unsupported region 86 connected to a ribbon linkage 88 coupled to a sidewall 48 and surface 50 of element 10. As shown in FIG. 5B, a portion of the silicon of element 10 is etched back to form four spring hinges 58. Hinges 58 allow element 10 to be rotated to greater angles of tip and tilt than possible by just elastic stretching of the dielectric film of linkages 88 alone. Metal film 60 deposited over thin-film members 42 forms four, electrically connected capacitor electrodes connected to regions 84 over which to bond electrical terminals.

Referring to FIG. 6, four orthogonally disposed, anamorphic surface contoured regions 64 are formed over and in a planar surface 36 of a substrate 100. And, four lateral channels 102 formed in substrate 100 are connected to contoured regions 64 to provide paths in which to deposit independent electrical conductors. A recessed central surface region 82 provides a bearing surface. Dashed outline 104 indicates the position at which micromachined structure 32 is bonded to substrate 100.

Figure 7:
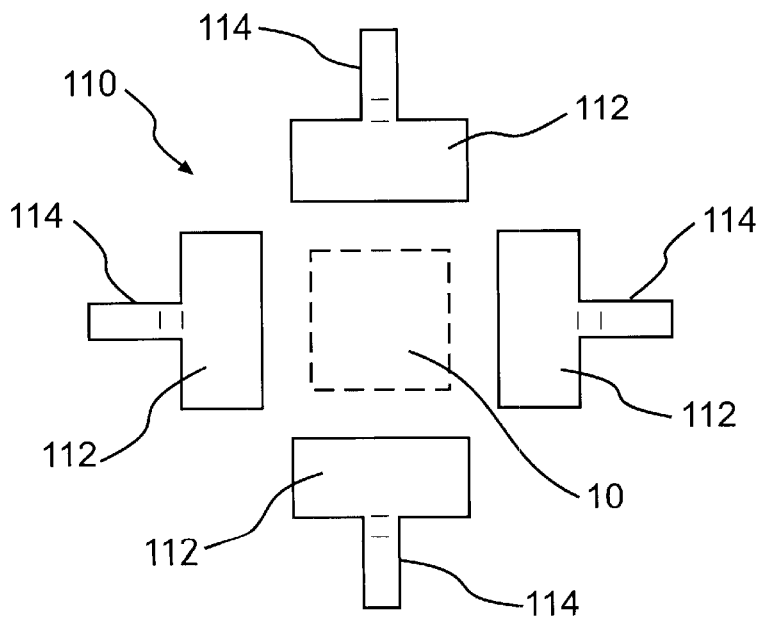
FIG. 7 is a top view of the rigid electrode arrangement of the first, two-axis embodiment.

FIG. 7 is a top view of an electrode arrangement generally indicated herein by reference number 110. Four, metal film electrodes 112 are deposited on contoured regions 64 of substrate 100. Each electrode has a connected tab 114 deposited within channels 102. Electrodes 112 comprise the stationary electrodes of four variable capacitors or two differential variable capacitors.

In an alternate construction of substrate 100, surface regions 64 comprise quadrants of a rotationally symmetric concave surface formed over and in surface 36. This continuous dish-shaped profile causes the outside edges 106 of unsupported regions 86 to first contact new areas of surface regions 64 as region 86 deflects. Accordingly, an electrostatic force acting on electrode 112 cause unsupported regions 84 to curl with deflection, thereby contributing an additional component to the effective spring of thin film members 42.

The contour of regions 56 of both aforementioned designs are selected to provide a continuously changing region of fixed capacitive spacing between metal film electrodes 112 and common metal film 60 for the four variable capacitors when a bias voltage of equal magnitude is applied to mechanically preload unsupported regions 86. In a simpler embodiment, a flexible electrode of one variable capacitor can be used to rotate optical element 10 in one direction around a first axis of rotation and a flexible electrode of an orthogonally disposed variable capacitor can be used to rotate optical element 10 in one direction around a second axis of rotation.

Second Preferred Single-Axis Embodiment

Figure 8:
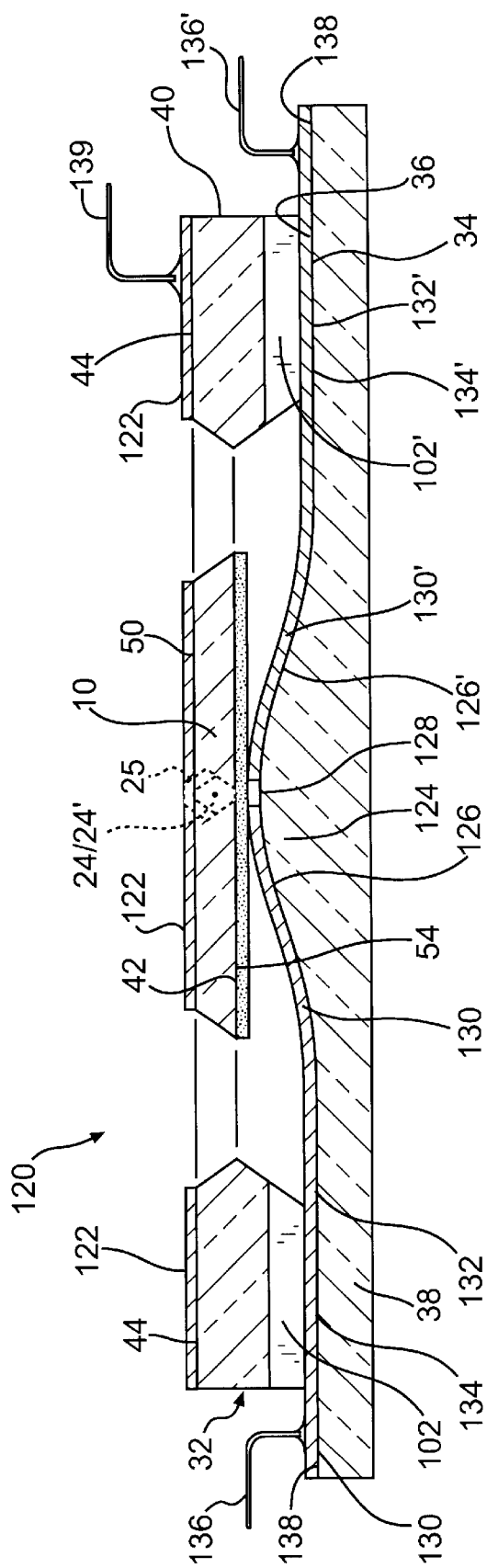
FIG. 8, is a sectional view of a second, single-axis embodiment of the present invention.

FIG. 8 is a sectional view of a second, single-axis embodiment of the present invention generally indicated herein by reference numeral 120. Transducer 120 comprises a micromachined structure 32 bonded at a bottom surface 34 to a top surface 36 of an insulating substrate 38. Micromachined structure 32 includes an optical element 10 and a support frame 40 etched from a wafer of high conductivity doped single-crystal silicon. Optical element 10 is coupled to opposing sides of support frame 40 by two, torsional flexure means 24 and 24' with axes normal to the plane of the diagram The flexure means angularly constrain element 10 to rotation around one free-axes of rotation. A metal film 122 is formed over surface 44 of support frame 40, over surface 50 of optical element 10, and on two top sides 25 of flexure means 24 and 24'. Metal film 122 electrically connects optical element 10 to support frame 40 over which to bond an electrical terminal. The conductivity of top sides 25 of flexure means 24 and 24' can be enhanced by a high dose ion implantation of boron. A dielectric layer 42 is formed on a bottom surface 54 of optical element 10. The bottom surface 54 comprises an common electrode for at least one variable capacitor or one differential variable capacitor. Two oppositely disposed channels 102 and 102' etched in and across bottom surface 34 of frame 40 to provide clearance for two electrical conductors.

Surface 36 of substrate 38 has a central raised portion 124 that provides a bearing to support optical element 10. Raised portion 124 has two, opposing anamorphic surface contoured regions 126 and 126' of constant width that are symmetrically disposed about a vertex 128 along a line perpendicular to the plane of the diaphragm. Contoured regions 126 and 126' are formed by processing methods described hereinbelow.

Figures 9, 12:
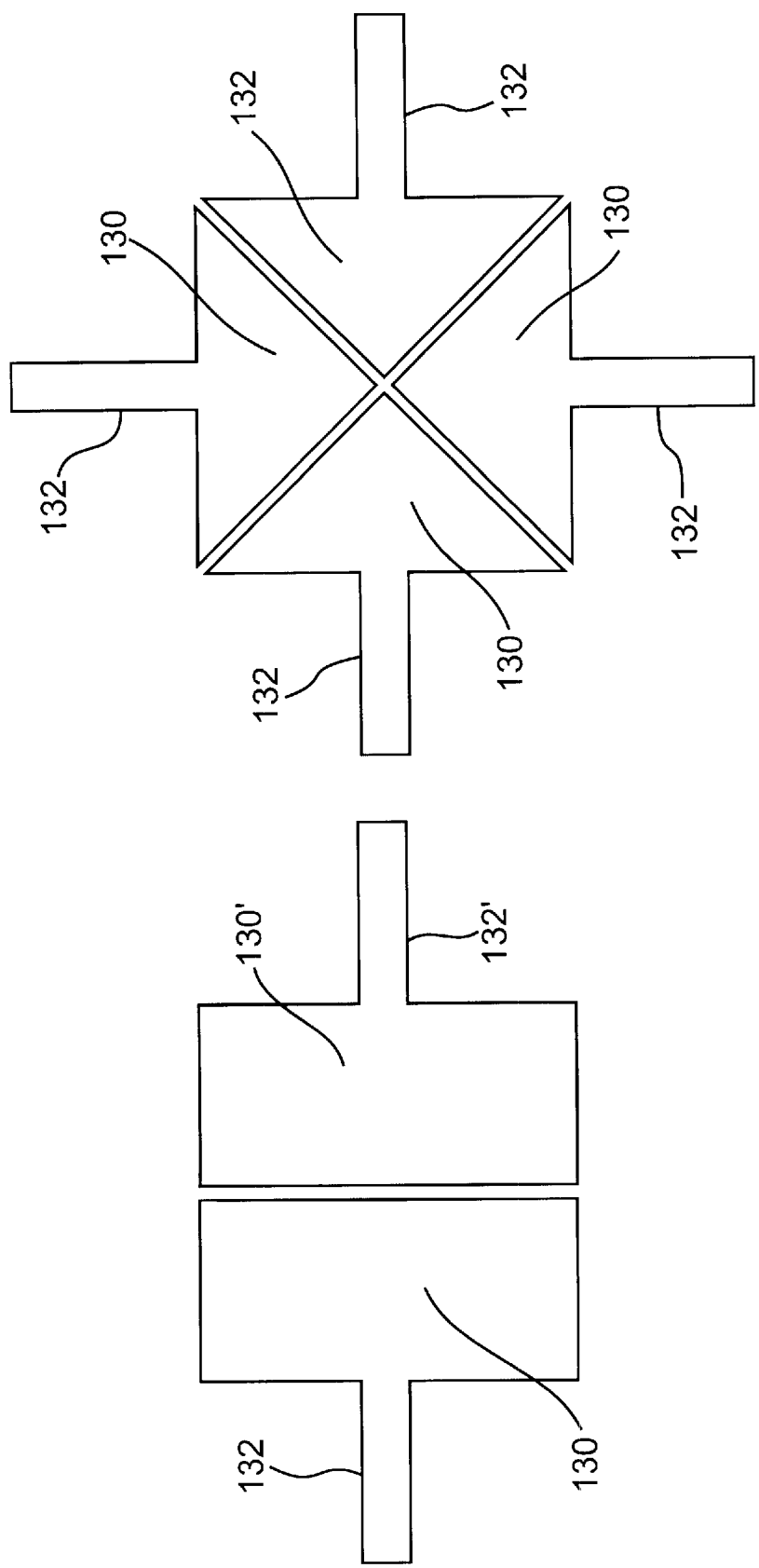
FIG. 9 is a top view of a film electrode arrangement of the embodiment of FIG. 8.
FIG. 12 is a top view a metal film electrode arrangement of the embodiment of FIG. 10.

FIG. 9 is a top view of a metal film electrode arrangement formed on substrate 38. A metal film 130 is formed on contoured region 126 and a connected extension 132 is formed along a path 134 on surface 36 under channel 102 as shown in FIG. 8. A second metal film 130' is formed on contoured region 126' and a connected extension 132' is formed along a path 134' under channel 102'. Electrical terminals 136 and 136' are bonded to metal film extensions 132 and 132' respectively on an outer lip portion 138 of substrate 38, and an electrode 139 is bonded to metal film 122 on top surface 44 of support frame 40.

Metal film 130 and bottom surface 54 of optical element 10 comprise the cooperating electrodes of a first, variable capacitor $C_1$. Metal film 130' and bottom surface 54 of optical element 10 comprise the cooperating electrodes of a second, variable capacitor $C_2$. Bottom surface 54 is a common electrode of both capacitors $C_1$ and $C_2$ that form a differential variable capacitor. Optical element 10 can be rotated counter-clockwise or clockwise by applying a voltage to terminal 136 or 136' respectively when terminal 139 is grounded. Dielectric film 42 establishes a region of fixed dielectric spacing between the stationary electrodes and the common movable electrode of capacitors $C_1$ and $C_2$. This causes a narrow region of fixed capacitance spacing, initially including vertex 128, to propagate down and across one surface contoured region (126 or 126') when optical element 10 rotates in response to a change in electric field coupling. The profile of contours 126 or 126' can be selected with the objective to provide a linear change in angular displacement with control voltage. In an alternate construction, optical element 10 can be constrained to rotate around a single axis of rotation by two torsional means having the construction of thin-film linkages 146 of FIG. 11 over which metal film 122 is deposited, rather than by micromachined flexure means 24 and 24'. In another alternate construction, thin film torsional means can be formed in metal film 122 with regions having the form of linkages 146. In still another alternate construction of substantially equivalent performance, dielectric layer 42 can be formed on surface contoured region 126 and 126'.

A simpler, single-side embodiment of transducer 120 can be constructed with one variable capacitor to angularly deflect optical element 10 in one direction of rotation. This embodiment requires only one control terminal (either 136 or 136') to rotate mirror element 10, or one terminal to sense and control the angle of optical element 10 by closed-loop electrostatic force feedback.

Second Preferred Two-Axis Embodiment

Figure 10:
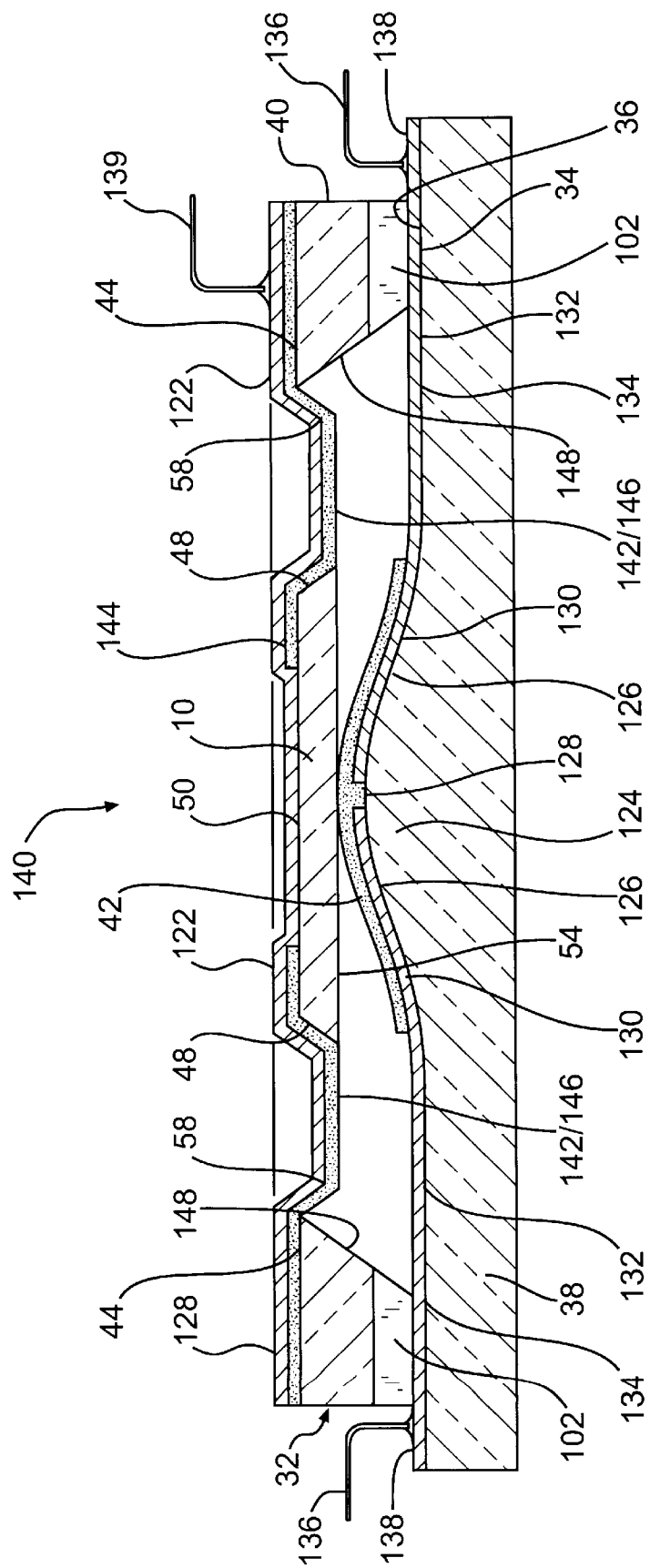
FIG. 10 is a sectional view of a second, two-axis embodiment of the present invention.
Figure 11:
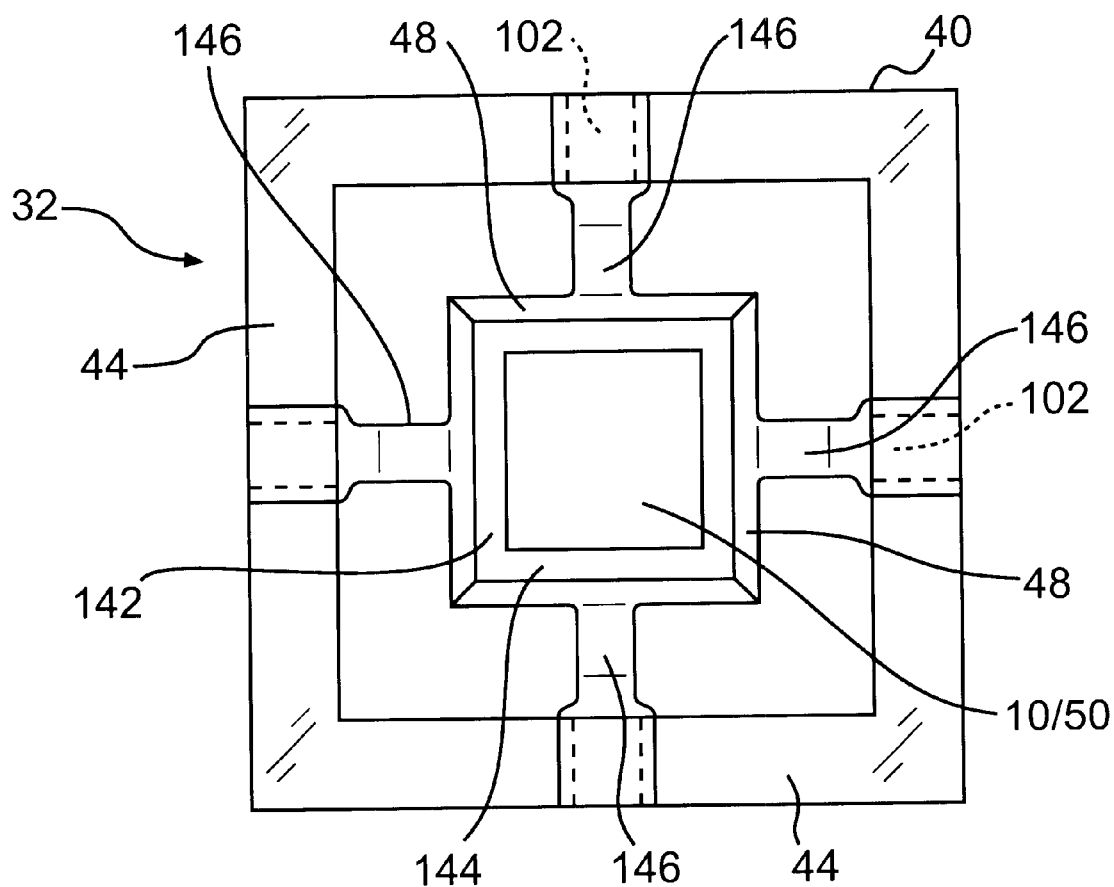
FIG. 11 is top view of a micromachined structure of the embodiment of FIG. 10.

FIG. 10 is a sectional view of a second, two-axis embodiment of the present invention generally identified herein by reference numeral 140. Transducer 140 comprises a micromachined structure 32 bonded at a bottom surface 34 to a top surface 36 of an insulating substrate 38. A top view of micromachined structure 32 is shown in FIG. 11. Micromachined structure 32 includes an optical element 10 and a support frame 40 etched from a wafer of high conductivity doped single-crystal silicon. Four orthogonally disposed channels 102 are etched in and across bottom surface 34 of frame 40 to provide clearance for four electrical conductors.

Referring to FIG. 11, a dielectric thin-film member 142 is formed on top surface 44 of frame 40; on opposing sidewalls 48 and a border region 144 on top surface 50 of optical element 10; and includes four, orthogonally disposed flexure linkages 146 that couple optical element 10 to frame 40. The flexure linkages angularly constrain element 10 to rotation around two free-axes of rotation. The silicon of lower interior walls 148 of frame 40 is etched back to form four spring hinges 58 as shown in FIG. 10. Hinges 58 reduce elastic stretching and bending stresses in torsional flexure linkages 146 as optical element 10 rotates from its neutral position. A metal film 122 is formed over thin-film 142 and at least a portion of the exposed silicon of surface 50. Metal film 122 electrically connects the high-conductivity doped silicon of element 10 to surface 44 of support frame 40 over which to bond an electrical terminal.

Substrate 38 has a central raised portion 124 that provides a bearing to support optical element 10. Raised portion 124 has four, surface contoured quadrants 126 with a common central vertex 128 formed by process methods described hereinbelow. FIG. 12 is a top view of a metal film electrode arrangement deposited on substrate 38. Metal film electrodes 130 are formed on each contoured quadrant 126 and connected extensions 132 formed along four orthogonally disposed paths 134 on surface 36 under channels 102 as shown in FIG. 10. Four electrical terminals 136 are bonded to metal film extensions 132 over an outer lip portion 138 of substrate 38, and a terminal 139 is bonded to metal film 122 over top surface 44 of support frame 40. For the embodiment shown in FIG. 10, a dielectric layer is formed over metal film electrodes 130 to provide regions of fixed capacitance spacing. Dielectric layer 42 could alternately be formed on bottom surface 54 of optical element 10, as shown in FIG.

8, to provide a transducer with substantially the performance of transducer 140. Metal film electrodes 130 and bottom surface 54 of optical element 10 comprise the cooperating electrodes of four variable capacitors. Bottom surface 54 comprises a common electrode of four capacitors or two differential capacitors. Optical element 10 can be rotated bi-directionally around two axes by applying voltages to selected terminals 136 when terminal 139 is grounded. Dielectric film 42 establishes a region of fixed dielectric spacing between stationary metal film electrodes 130 and bottom surface 54 for at least two variable capacitors. When optical element 10 resides at its neutral position, a small region of fixed capacitance spacing that includes vertex 128 exists between the capacitor electrodes. When a control and bias voltage is applied across a pair of cooperating electrodes, a change in electric field coupling causes conducting surface 54 to tilt and the initial region of fixed capacitance spacing propagates down and across metal film electrode 130 on the associated contoured quadrant 126. The angular position of optical element 10 can be controlled to high angular resolution accuracy by electrostatic force feedback described hereinabove.

A simpler, embodiment of transducer 140 can be constructed with one variable capacitor to angularly deflect optical element 10 in one direction of rotation around one axis of rotation and a second variable capacitor to angularly deflect optical element 10 in one direction of rotation around a second orthogonal axis of rotation. This embodiment requires only two control terminals to rotate mirror element 10 around two axes or two terminals to sense and control the angle of optical element 10 around two axes.

Fabrication Processes

The embodiments of the present invention can be batch fabricated by well-known IC and MEMS processing methods. The representative processing steps, materials, and bonding methods described below can be modified to accommodate the physical size of optical elements over a range typical of microscale and mesoscale devices. The following processing steps are described for transducer 90 that comprises micromachined structure 32 of FIGS. 5A and 5B that is bonded to substrate 100 of FIG. 6. Optical element 10 is constrained by micromachined structure 32 from rotation around one axis of rotation. Structure 32 can be fabricated from a silicon wafer using either wet chemical or dry plasma etching methods. For this example, anisotropic etching of silicon is performed using a standard aqueous potassium hydroxide (KOH) solution. Short isotropic etching steps are performed using a standard "HNA" mixture of hydrofluoric acid, nitric acid, and acetic acid.

Figure 13A:
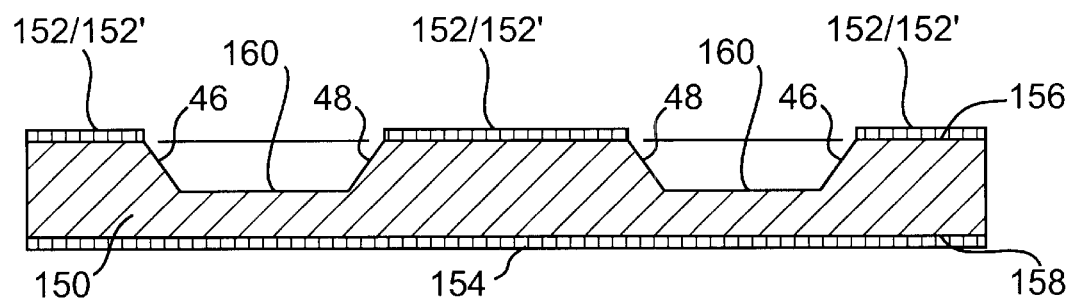
FIGS. 13A–H show the general processing steps to fabricate a micromachined structure for a first, two-axis embodiment of the present invention.
Figure 13B:
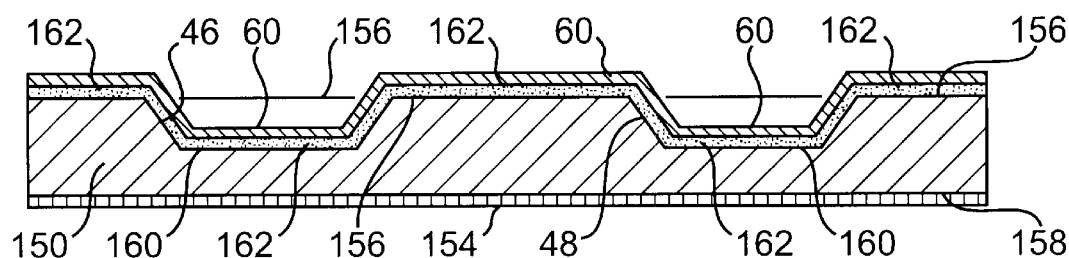

FIGS. 13A–H show the principal processing steps used to fabricate micromachined structure 32. The process starts with the step of providing a double-side polished wafer 150 of (100) crystal orientation. Referring to FIG. 13A, silicon dioxide ("oxide") layers 152 and 154 are thermally grown on top and bottom surfaces 156 and 158 respectively of wafer 150. Oxide layer 152 is lithographically patterned and etched to provide an etch-stop mask 152' to anisotropically etch selected regions of top surface 156. Surface 156 is etched back to form planar surface 160, walls 46, and sidewalls 48. A short isotropic etch is performed to round the sharp edges of the silicon features to provide more reliable surfaces over which to deposit dielectric and metal films. Next, oxide mask 152' is stripped with a standard buffered HF solution and a low-pressure chemical vapor deposition (LPCVD) is performed to form a silicon nitride layer 162 over top surface 156, walls 46, sidewalls 48, and etched back surface 160 as shown in FIG. 13B. A metal film 60 is then vacuum sputter deposited over nitride layer 162. The choice of metals for film 60 are discussed hereinbelow.

Figure 13C:
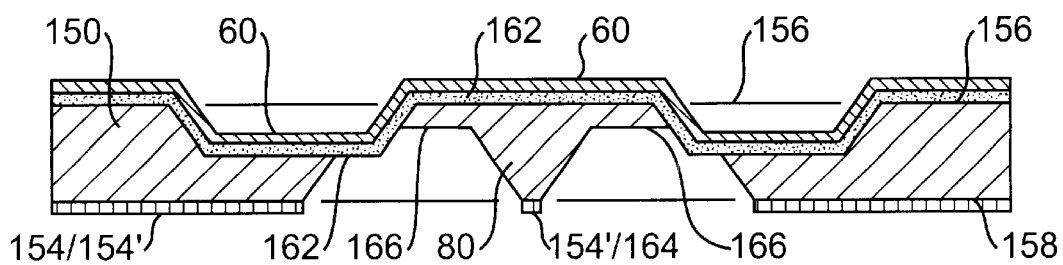
Figure 13D:
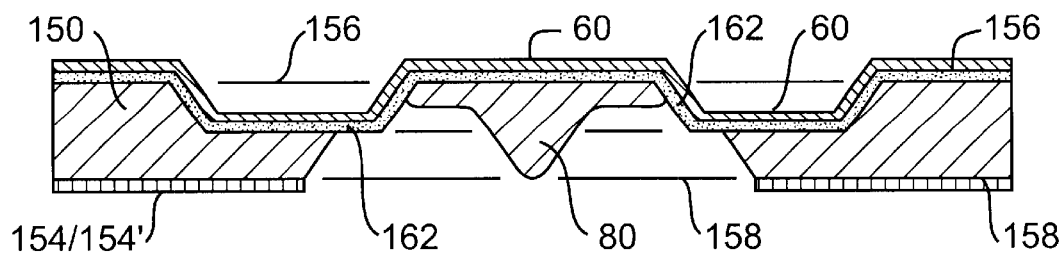
Figure 13E:
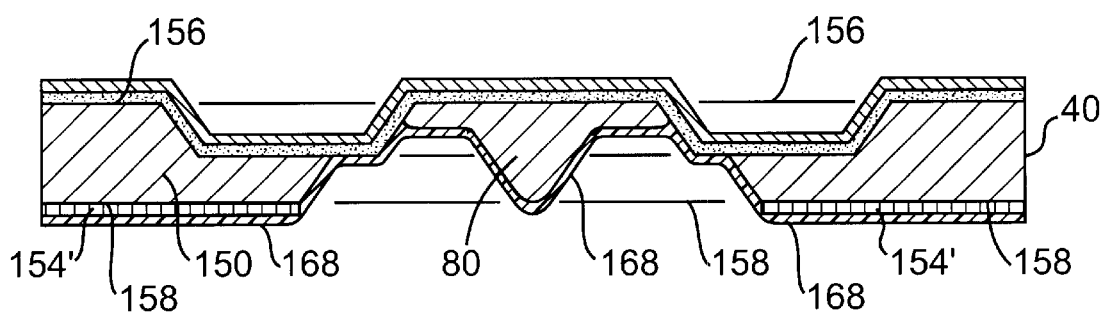
Figure 13F:
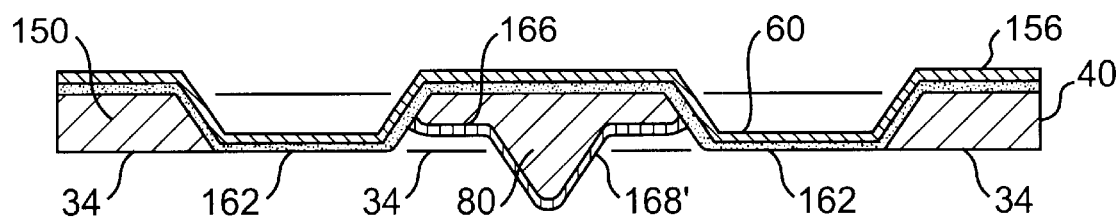
Figure 13G:
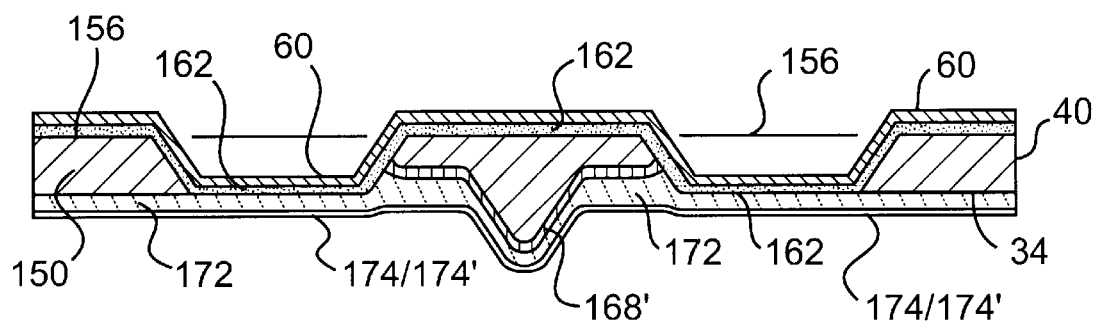
Figure 13H:
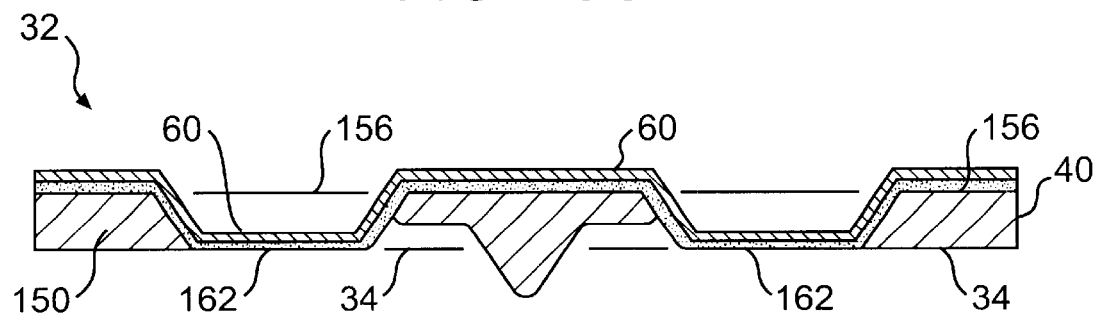

Before proceeding to bottom side wafer processing, dedicated regions of top surface 156 of wafer 150 are temporarily bonded to a handle wafer tool, not shown. Referring to FIG. 13C, oxide layer 154 is lithography patterned and etched to provide an etch-stop mask 154' that includes a small masking element 164 with edges substantially aligned to the 110 directions of the (100) silicon. Selected regions of bottom surface 158 are then anisotropically etched back to surface 166 to form bearing 80 and establish the thickness of optical element 10. The thickness of the element is selected to ensure surface 50 remains optically flat with applied forces and stresses of deposited films. Masking element 164 on bearing 80 is stripped using a photoresist mask and buffered HF. Next, a short isotropic etch is performed to round the edges of bearing 80 to provide a smooth pivot surface, as shown in FIG. 13D. Referring to FIG. 13E, a low-temperature PECVD masking layer 168 of silicon dioxide is deposed over the entire bottom surface 158 of wafer 150. Masking layer 168 is then patterned and etched to form a protective mask 168' over bearing 80 and surface 166 as shown in FIG. 13F. The residual oxide of mask 154' on frame 40 is also removed during this process step. The bottom surface 158 of wafer 150 is then anisotropically etched back to the level of nitride layer 162 to form planer surface 34 that is subsequently bonded to substrate 100. The depth of etch can be controlled using laser end-point detection to establish the depth of surface 34 with respect to the apex of bearing 80. Referring to FIG. 13G, a polymer planarization layer 172 is formed over surface 34, exposed nitride layer 162, and the remaining portion of oxide mask 168'. A chrome masking layer 174 is then vacuum deposited over layer 172. Chrome layer 174 is litho-graphically patterned and etched to provide a plasma RIE etch mask 174'. Selected regions of silicon nitride layer 162 with metal film 60 are then reactively ion etched to form free-standing linkages 88 in thin-film members 42 shown in the top view of micromachined structure 32 in FIG. 5A. If metal film 60 is a multi-metal system with an intermediate layer of platinum, the thickness of chrome layer 174 can be increased and/or the RIE step followed by short aqua regia etch. FIG. 13H shows micromachined structure 32 after performing the final steps of stripping chrome mask 174', underlying planarization layer 172, the remaining portion of oxide mask 168', and removing the handle wafer tool from top surface 156.

Metal film 60 can be a vacuum sputter deposited layer of material such as aluminum, gold over chromium, or gold over platinum over titanium. The type of metal film is selected based in part by the method used to bond micromachined structure 32 to substrate 100. If high temperature fusion or anodic bonding is used, a metal film with an intermediate platinum barrier layer prevents a gold top layer from alloying.

All the embodiments of the present invention have at least one surface contour region formed from a top portion of a substrate. The profile of the surface contour can comprise a slope, cylindrical surface, anamorphic surface, spherical surface, or aspherical surface area. The steps required to form the surface contoured regions depend in part upon whether a void, recessed surface, or raised central region is required to be formed in the center of the substrate.

Substrate 100 of transducer 90 can be fabricated from borosilicate or aluminosilicate glass; or from a silicon substrate with an insulting layer of LPCVD silicon dioxide, phosphosilicate glass (PSB), or borophosphosilicate glass (BPSB), boron oxide, or spin-on-glass.

Figure 14A:
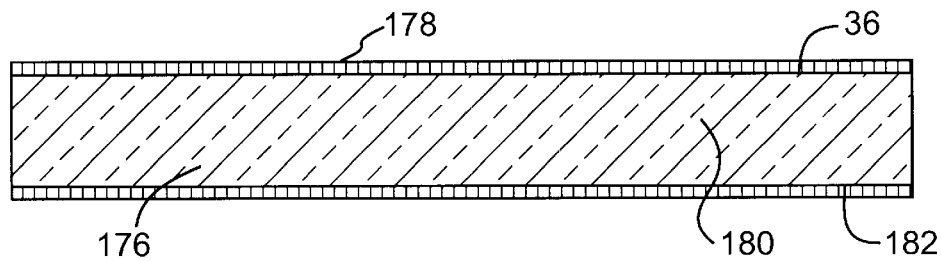
FIGS. 14A–E show the general processing steps used to fabricate a substrate for the first, two-axis embodiment of the present invention.
Figure 14B:
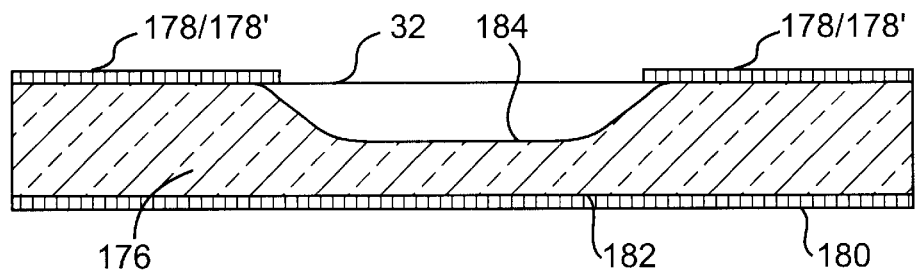
Figure 14C:
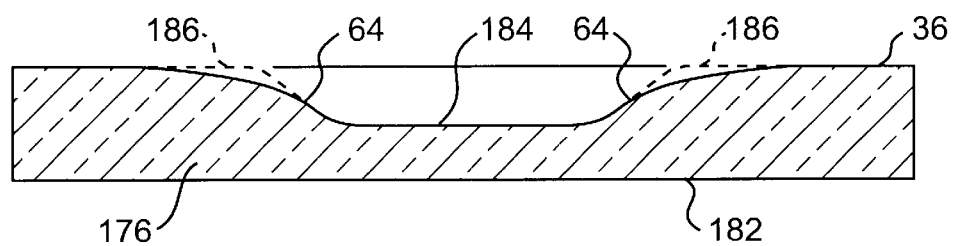
Figure 14D:
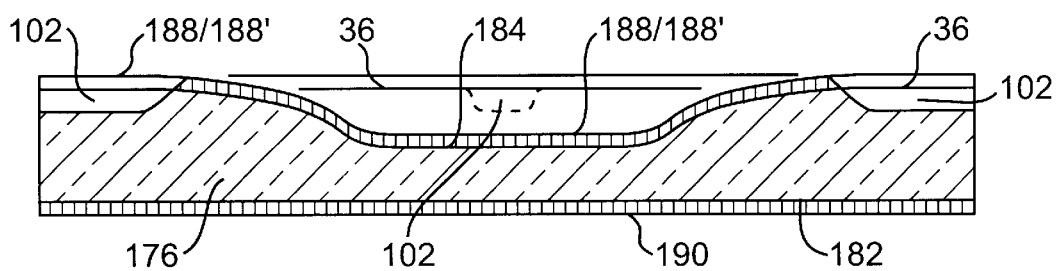
Figure 14E:
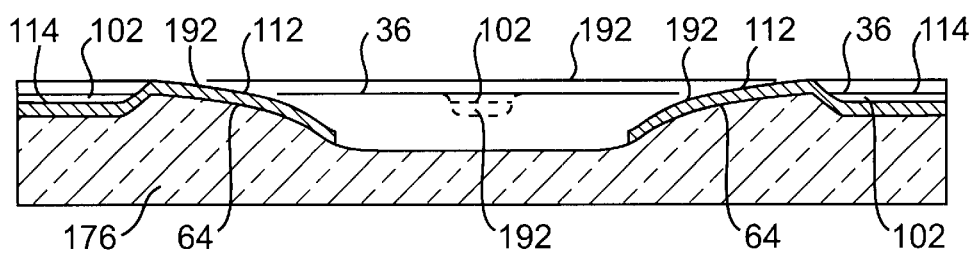

FIGS. 14A–E show the general processing steps to fabricate substrate 100 of FIG. 6 for transducer 90 when the substrate comprises an insulating material. The first step is to provide a glass wafer 176 (e.g., Corning 7740 or Hoya SD-2 glass) with an optically flat top surface 36. A LPCVD polysilicon layer 178 and 180 is deposited on top surface 36 and bottom surface 182 respectively as shown in FIG. 14A. Referring to FIG. 14B, polysilicon layer 178 is lithographically patterned and etched to form an etch stop mask 178'. Glass wafer 176 is isotropically etched in a buffered HF solution to form cavity 184 and then mask 178' and polysilicon layer 180 are stripped in an aqueous KOH solution. Bottom surface 182 of wafer 176 is then mounted to a Pyrex™ glass blocking body, not shown, using optical blocking wax. Top surface 36 of wafer 176 is optically polished to polish etched corner edges 186 as shown by dashed lines in FIG. 14C to form four, smooth, orthogonally disposed surface contours regions 64 as also shown in FIG. 6. This polishing step is performed on a double-spindle polishing machine using a polymeric polishing pad and a slurry with submicron cerium oxide abrasive particles. The polishing pressure, stiffness of the pad lap, and mean particle size of the abrasive particles is selected and controlled to establish the profile of contoured regions 64. A optional second, chemical-mechanical polishing step can be performed with a napped polyurethane finishing lap and a silica hydrosol slurry to form a microscopically smooth surface substantially free of micro-scratches and subsurface work damage. The next processing step is to deposit a second LPCVD polysilicon masking layer 188 on surface 36 and over and in cavity 184 and a second protective masking layer 190 over bottom surface 182 as shown in FIG. 14D. Masking layer 188 is then lithographically pattered and etched to form an etch stop mask 188'. Mask 188' is used to isotropically etch four, orthogonally disposed lateral channels 102 with buffered HF as also shown in FIG. 6. Referring to FIG. 14E, polysilicon mask 188' and masking layer 190 are stripped in a KOH solution and metal film 192 is vacuum sputter deposited over top surface 36. Metal film 192 can comprise the metals identified hereinabove for metal film 60 of micromachined member 32. The final step in the fabrication of substrate 100 is to lithographically pattern and etch metal film 192 to form metal film electrodes 112 over surface contoured regions 64 with connected tabs 114 in channels 102 also shown in FIG. 7.

Contoured regions 64 can be fabricated with other profiles from those achieved by simply polishing the corner edges of a cavity, through hole, or raised surface feature. Profiles on large substrates, or profiles that provide a more specific electrostatic force characteristic can be formed from a set of nested cavities etched in surface 36 using multiple etch-back masks of graduated size. The top corner edges of each nested cavity can be smoothed by polishing; by partial planarization methods, e.g., the deposition and thermal reflow of a LPCVD PSB or BPSB glass film; or by a combination of polishing and planarization techniques. Laser ablation, selective plasma etching, and focused ion milling can be used to contour surfaces for smaller size transducers. For substrates of silicon, surface contoured regions 64 can be formed by 3-D laser induced microchemical etching before the deposition of an insulating layer. The following method can be used to form raised surface region 124 and surface contoured regions 126 and 126' on a borosilicate glass substrate 38 of transducer 120 of FIG. 8. A strip or ridge of LPCVD phosphosilicate or borophosphosilicate glass is formed across a central section of surface 36 of substrate 38. The effective height of one or more layers of glass that comprise the ridge can be increased by depositing the glass over elevating features formed earlier on surface 36. The material of the underlying elevating features can be formed from PCVD polysilicon or a bonded layer of single-crystal silicon. The profile of surface contour regions 126 and 126' is then formed by any one, or a combination, of the following conventional processing steps: thermal reflow of the deposited glass, selective plasma etching, laser micromachining, and chemical-mechanical polishing. The desired profiles can be tailored by varying the height, width, and number of glass and silicon layers. The surface contoured regions 124 for transducer 140 can be formed in a similar manner from round or square features using one of the processing methods identified hereinabove.

Surface contoured regions of the stationary capacitor electrodes of the transducers of the present invention can also be fabricated in or on a thermoplastic substrate or surface layer by micro-molding, embossing, and thermal forming. Recently, methods have been used to fabricate bas-relief structures with nanometer dimensional tolerances from organic polymers and gels on substrates using soft and hard stamps and from UV curable polymers using a lithographically patterned master.

Actuation and Closed Loop Control

Figure 15:
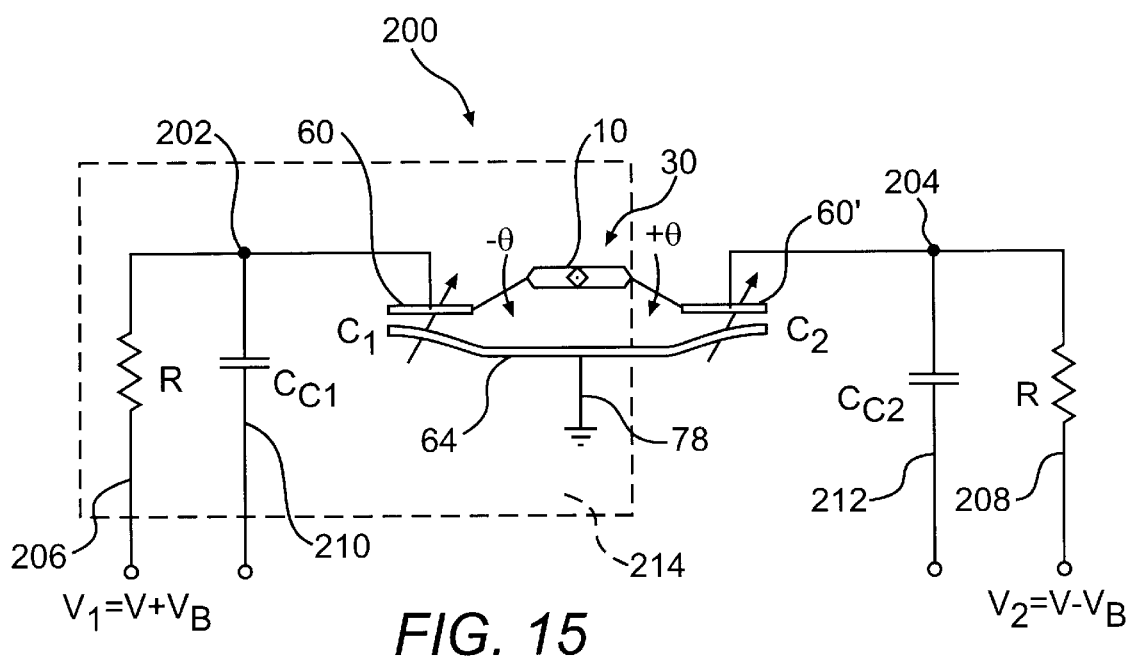
FIG. 15 is a simplified opto-electro-mechanical diagram that shows electrical connections to sense and control the tilt angle of the first, single-axis embodiment of the present invention.
Figure 16:
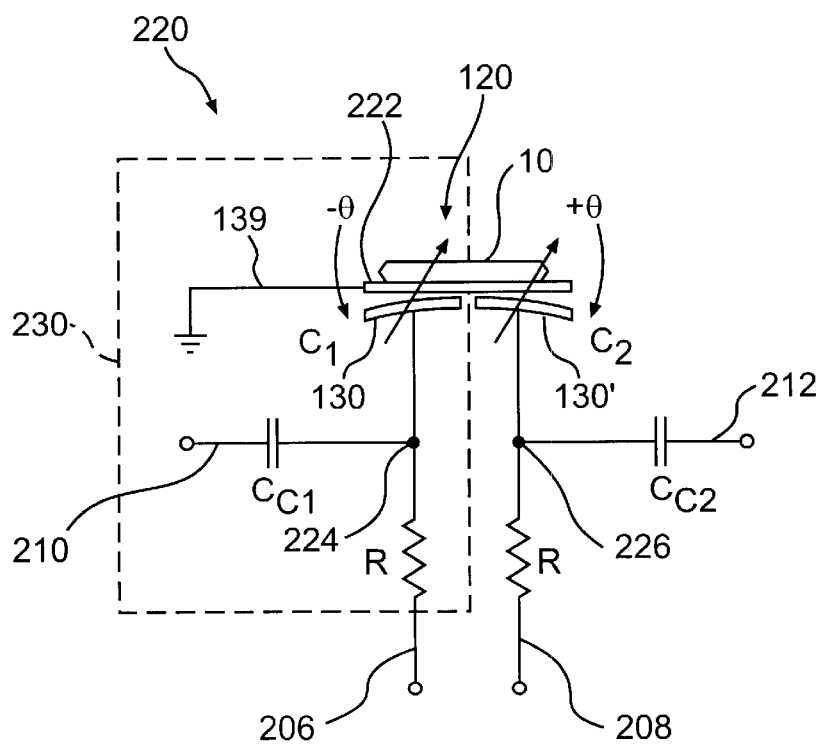
FIG. 16 is a simplified opto-electro-mechanical diagram that shows electrical connections to sense and control the tilt angle of the second, single-axis embodiment of the present invention.
Figure 17:
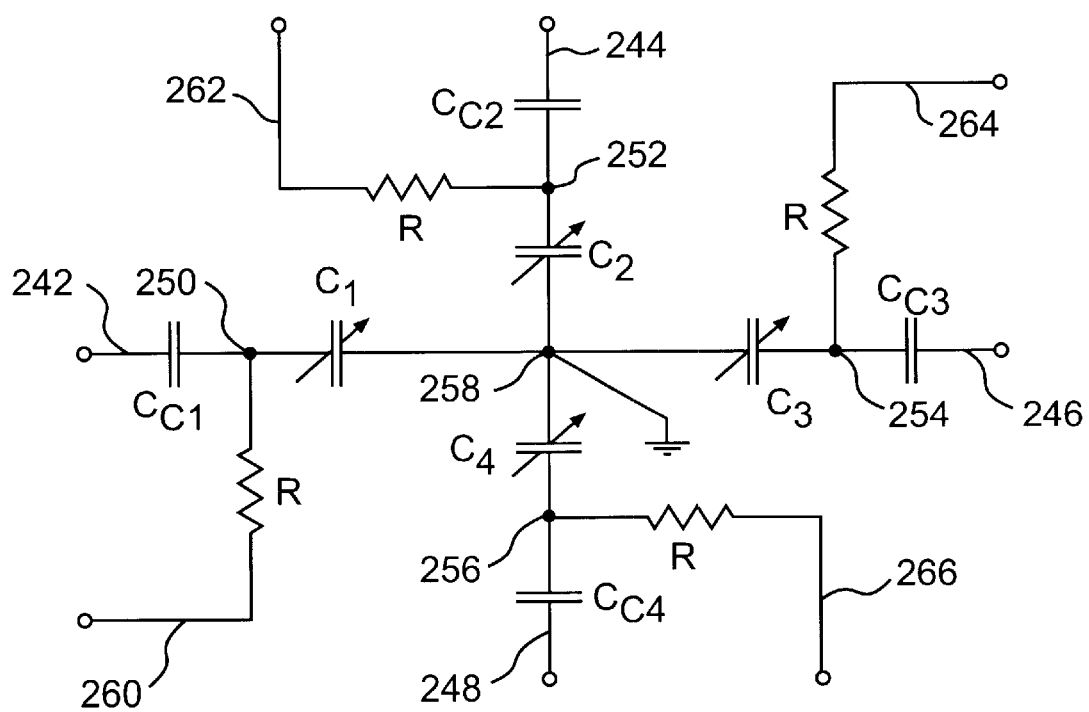
FIG. 17 is an electrical schematic diagram that shows electrical connections to sense and control the tip and tilt angles of two-axis embodiments of the present invention.

A preferred method to control the angular position of an optical element by electrostatic force feedback was referred to hereinabove. Other force-balance feedback methods can be used, e.g., the method used by Sherman, U.S. Pat. No. 5,540,095, when it is not critical to electrically ground one capacitor electrode. FIGS. 15 to 17 identify circuit arrangements to connect preferred embodiments of the present invention to electronics used to sense and control the position of an optical element. For certain applications, when a multitude of micromirrors are formed in a dense array, it is desirable to minimize the number of transducer control electrodes to accommodate packaging and pinout restrictions. This can be accomplished by providing transducers with minimum construction with only one electrode used to control a mirror in one direction of rotation.

FIG. 15 is a simplified opto-electro-mechanical circuit diagram generally indicated herein by reference numeral 200 that includes transducer 30 of FIG. 3. Transducer 30 includes two variable capacitors $C_1$ and $C_2$ with thin film electrodes 60 and 60' electromechanically coupled to opposing portions of optical element 10. Electrodes 60 and 60' are connected to nodes 202 and 204 respectively, and common stationary electrode 64 of capacitors $C_1$ and $C_2$ is connected to terminal 78 connected to ground or another reference potential. Control voltage terminals 206 and 208 are connected to resistors R connected to modes 202 and 204 respectively. A capacitance measurement terminal 210 is connected to a first coupling capacitor $C_{C1}$ connected to node 202 and a capacitance measurement terminal 212 is connected to a second coupling capacitor $C_{C2}$ connected to node 204. A voltage applied to terminal 206 charges capacitor $C_1$ which couples an electrostatic torque to rotate optical element 10 counter-clockwise by a tilt angle $-\theta$. Similarly, a voltage applied to terminal 208 charges capacitor $C_2$ which couples an electrostatic torque to rotate optical element 10 clockwise by a tilt angle $+\theta$. Since capacitors $C_1$ and $C_2$ have a common electrode 64, the two cooperating capacitors comprise a differential variable capacitor that can bi-directionally rotate optical element 10. The angular displacement of optical element 10 can be controlled by differential electrostatic torque balanced feedback by measuring the values of capacitors $C_1$ and $C_2$ at terminals 210 and 212 and applying a feedback control voltage to terminals 206 or 208. An aforementioned method to control optical element 10 is to apply a voltage $V_1$ and $V_2$ to terminals 206 and 208 that comprises a control voltage V superimposed on differential bias voltages $+V_B$ and $-V_B$ as indicated in FIG. 15. For this control method, optical element 10 will be rotated by an angle θ by voltage V to a new position of force balanced equilibrium. It is desirable to integrate the two resistors, two coupling capacitors, and nodes 202 and 204 with the control electronics. This allows the transducer 30 to be operated with only two differential control electrodes and one grounded electrode. The circuit arrangement in box 214 represents a minimum construction of transducer 30 with only one direction of controlled tilt.

FIG. 16 is a simplified opto-electro-mechanical circuit diagram generally indicated herein by reference numeral 220 that includes transducer 120 of FIG. 8. Transducer 120 includes an optical element 10 with a electrically conducting bottom surface that comprises a movable common electrode 222 for two variable capacitors $C_1$ and $C_2$. Stationary electrodes 130 and 130' of capacitors $C_1$ and $C_2$ are connected to nodes 224 and 226 respectively, and common electrode 222 is connected to terminal 139 connected to ground or another reference potential. Control voltage terminals 206 and 208 are connected to resistors R connected to modes 224 and 226 respectively. A capacitance measurement terminal 210 is connected to a first coupling capacitor $C_{C1}$ connected to node 224 and a capacitance measurement terminal 212 is connected to a second coupling capacitor $C_{C2}$ connected to node 226. A voltage applied to terminal 206 charges capacitor $C_1$ which couples an electrostatic torque to rotate optical element 10 counter-clockwise by an angle −θ. Similarly, a voltage applied to terminal 208 charges capacitor $C_2$ which couples an electrostatic torque to rotate optical element 10 clockwise by an angle +θ. Since capacitors $C_1$ and $C_2$ have a common electrode 222, the two capacitors comprise the cooperating capacitors of a differential variable capacitor that can bi-directionally rotate optical element 10. The angular displacement of optical element 10 can be controlled and maintained by the electrostatic force feedback method described for transducer 30 in the circuit arrangement of FIG. 15. As for the circuit arrangement of FIG. 15 it is desirable to integrate the two resistors, two coupling capacitors, and nodes 224 and 226 with the control electronics. This allows the transducer 30 to be operated with only two differential control electrodes and one grounded electrode. The circuit arrangement in box 230 represents a minimum construction for transducer 120 with only one direction of controlled tilt.

Figure 18:
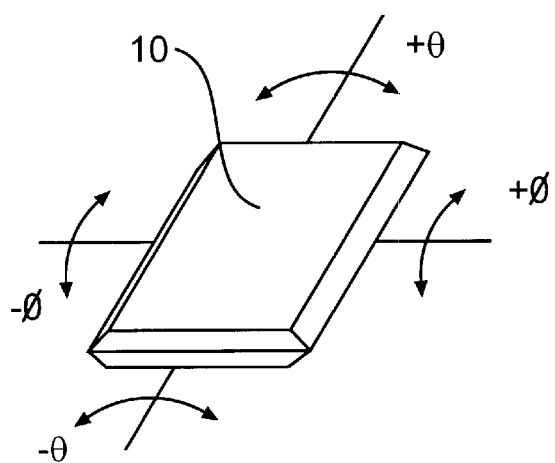
FIG. 18 shows the tip and tilt directions of an optical element.

FIG. 17 is a simplified electrical diagram that shows the electrical connections used to sense and control the tip and tilt angles of optical element 10 around of two axes of rotation for the preferred, two-axis embodiments of the present transducer. The capacitance values of four variable capacitors, $C_1$, $C_2$, $C_3$, and $C_4$ are measured at terminals 242, 244, 246, and 248 respectively that are connected to larger value coupling capacitors $C_{C1}$, $C_{C2}$, $C_{C3}$, and $C_{C4}$ connected to nodes 250, 252, 254, and 256 connected to a first side of variable area capacitors $C_1$, $C_2$, $C_3$, and $C_4$ respectively. The second sides of capacitors $C_1$, $C_2$, $C_3$, and $C_4$ are commonly connected as shown schematically at node 258 which is connected to ground or another reference potential. Four, control voltage terminals 260, 262, 264, and 266 are connected to resistors R connected to nodes 250, 252, 254, and 256 respectively. Referring to FIG. 18, a voltage applied to one of the four control terminals couples an electrostatic torque to optical element 10 to tip or tilt the element by an angle −θ or +θ or by an angle −φ or +φ. Element 10 can be controlled and maintained at a tip angle θ by incorporating capacitors $C_1$ and $C_2$ in a first differential force feedback circuit and controlled and maintained at a tilt angle φ by incorporating capacitors $C_2$ and $C_4$ in a second differential force feedback circuit.

For high speed beam steering and scanning applications, the resistors R in the diagrams of FIGS. 15, 16, and 17 can be replaced with an inductor or a feedback compensation network selected to achieve an specific dynamic response.

It is noted herein that the differential capacitors of the preferred embodiments of the present invention can be operated by biasing opposing control terminals with a bias voltage of the same polarity. For this arrangement, a differential drive (bipolar control voltages) is required.

Only one control electrode is required for a variable capacitor when its associated resistor and coupling capacitor are integrated with control electronics.

The specific details of the embodiments described above are not intended to limit the scope of the appended claims and their legal equivalents.

What is claimed is:

1. An opto-electro-mechanical transducer in which a rigid body is angularly displaced by electric field coupling around at least one free-axis of rotation comprising:
    a. at least one variable capacitor with a movable electrode coupled to said rigid body constrained by structural means to angular displacement around said at least one free-axis of rotation;
    b. said at least one variable capacitor having a cooperating stationary electrode affixed to said structural means and said stationary electrode having a surfaced contoured region facing said movable electrode;
    c. a thin dielectric member sandwiched between the electrodes of said at least one variable capacitor;
    d. said surface contoured region formed to constrain the approach of said movable electrode to said stationary electrode, whereby a condition of controlled electrostatic collapse with voltage applied to said at least one variable capacitor is maintained over a range of angular displacement of said rigid body.

2. The apparatus of claim 1 wherein said rigid body is selected from the group consisting of a mirror, lens, grating, filter, holographic element, electrical contact, and a mechanical contact.

3. The apparatus of claim 1 wherein said support means includes two opposing torsional flexure means to constrain said rigid body to rotation around a second said at least one free-axis of rotation.

4. The apparatus of claim 1 wherein said thin dielectric member includes at least one hinged section.

5. The apparatus of claim 1 wherein said structural means includes at least one hinged section.

6. The apparatus of claim 1 wherein said structural means includes a bearing.

7. The apparatus of claim 1 wherein said structural means includes a bearing surface.

8. The apparatus of claim 1 wherein said thin dielectric layer is formed on one capacitor electrode.

9. The apparatus of claim 1 wherein an oppositely disposed second said at least one variable capacitor with a movable electrode is coupled to said rigid body, whereby said rigid body is rotated around a second said at least one free-axis of rotation.

10. The apparatus of claim 1 wherein one electrode of said at least one variable capacitor is electrically connected to one electrode of a second said at least one variable capacitor, whereby a differential variable capacitor is formed to bi-directionally rotate said rigid body around said at least one free-axis of rotation.

11. The method of claim 10 wherein one electrode of a third said at least one variable capacitor is electrically connected to one electrode of a fourth said at least one variable capacitor, whereby a second differential variable capacitor is formed to bi-directionally rotate said rigid body around a second said axis of free-axes of rotation.

12. A method to fabricate an opto-electro-mechanical transducer in which a rigid body is angularly displaced by electric field coupling around at least one free-axis of rotation comprising the steps of:
   a. Providing a first substrate with a planar bottom surface and a second substrate with a top portion including at least one stationary capacitor electrode with a surface contoured region;
   b. forming in said first substrate a rigid body connected to structural means to constrain said rigid body to angular displacement around said at least one free-axis of rotation;
   c. coupling at least one movable cooperating capacitor electrode to said rigid body;
   d. affixing a thin dielectric layer to one capacitor electrode;
   e. bonding said planar bottom surface of said first substrate to said second substrate in a region surrounding said surface contoured region to form at least one variable capacitor with a region of said dielectric layer in contact with portions of the electrodes of least one variable capacitor, whereby said surface contoured region constrains the approach of said at least one movable cooperating electrode with voltage applied to said at least one variable capacitor to maintain a condition of controlled electrostatic collapse over a range of angular displacement of said rigid body.

13. The method of claim 12 wherein said rigid body comprises a member selected from the group consisting of a mirror, lens, grating, filter, holographic element, electrical contact, and a mechanical contact.

14. The method of claim 12 further including in Step 12a a step of forming at least one hinge section in said structural means.

15. The method of claim 12 further including in Step 12a providing said surface contoured region formed at least in part by processing steps selected from the group consisting of optical polishing, chemical mechanical polishing, conformal film deposition, thermal reflow, multiple etch-back masking, thermal reflow, laser ablation, laser micromachining, selective plasma etching, focused ion milling, laser induced microchemical etching, micro-molding, embossing, thermal forming, soft stamping, and hard stamping.

16. A method to angularly displace a rigid body by electric field coupling around at least one free-axis of rotation comprising the steps of:
   a. providing at least one differential variable capacitor coupled to opposing portions of said rigid body constrained by structural means to angular displacement around at least one axis of rotation;
   b. said at least one differential variable capacitor comprising two cooperating capacitors each having a portion of a thin dielectric member sandwiched between a movable electrode and a stationary cooperating electrode with a surface contoured region;
   c. applying a fixed bias voltage of equal magnitude across the cooperating capacitors of said at least one differential variable capacitor;
   d. superimposing a control voltage on said bias voltage to couple a corresponding at least one electrostatic torque to said rigid body, whereby said rigid body is angularly displaced to a new position of force balanced equilibrium and a condition of controlled electrostatic collapse is maintained over a range of angular displacement of said rigid body.

17. The method of claim 16 further including the step of connecting one electrode of each cooperating capacitor of said at least one differential variable capacitor to a coupling capacitor connected to differential inputs of a capacitive measurement circuit with a feedback voltage output connected back to each same said one electrode, whereby an angular position of said rigid body around at least one free-axis of rotation is measured and maintained by a method of electrostatic-force feedback.

18. The method of claim 16 further including the step of connecting one electrode of each cooperating capacitor of a second said at least one differential variable capacitor to two coupling capacitors connected to differential inputs of a second capacitance measurement circuit with a feedback voltage connected to each same said one electrode of said second differential measurement circuit, whereby an angular position of said rigid body around a second one free-axis of rotation is measured and maintained by a method of electrostatic-force feedback.

19. The method of claim 16 wherein said control voltage comprises a differential voltage.

* * * * *